US012561311B1

(12) United States Patent
Upadhyay et al.

(10) Patent No.: US 12,561,311 B1
(45) Date of Patent: Feb. 24, 2026

(54) ADVANCING A DURABILITY MARKER FOR A LOG ACCORDING TO ORDERED LOG RECORD BATCHES

(71) Applicant: Amazon Technologies, Inc., Seattle, WA (US)

(72) Inventors: Dhruv Deepak Upadhyay, San Jose, CA (US); Yihao Yang, San Jose, CA (US); Ye Sheng, Fremont, CA (US); Sudhir Kumar, Dublin, CA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 18/830,948

(22) Filed: Sep. 11, 2024

(51) Int. Cl.
$$\begin{array}{lll} \textit{G06F 16/20} & (2019.01) \\ \textit{G06F 16/23} & (2019.01) \\ \textit{G06F 16/27} & (2019.01) \end{array}$$

(52) U.S. Cl.
CPC ...... G06F 16/2365 (2019.01); G06F 16/2329 (2019.01); G06F 16/27 (2019.01)

(58) Field of Classification Search
None
See application file for complete search history.

(56) References Cited

U.S. PATENT DOCUMENTS

| | | | |
|---|---|---|---|
| 7,756,838 | B2 | 7/2010 | Kulesza |
| 8,924,370 | B2 | 12/2014 | Shadmon |
| 8,934,338 | B2 | 1/2015 | Jacquet |
| 9,519,510 | B2 | 12/2016 | Strauss |
| 10,986,021 | B2 | 4/2021 | Schmatz |
| 11,321,343 | B2 | 5/2022 | Srinivasan |
| 11,762,656 | B2 | 9/2023 | Rudraraju |
| 11,816,073 | B1 | 11/2023 | Chakrabarti |
| 11,838,351 | B1 | 12/2023 | Iliofotou |
| 12,007,977 | B1 | 6/2024 | Singh |
| 2012/0323849 | A1* | 12/2012 | Garin, Jr. ................ G06F 16/27 707/E17.005 |
| 2017/0357667 | A1 | 12/2017 | Auch |
| 2019/0325055 | A1 | 10/2019 | Lee |
| 2023/0062198 | A1 | 3/2023 | Chen |
| 2024/0289329 | A1* | 8/2024 | Amirishetty ........... G06F 16/27 |
| 2024/0362063 | A1 | 10/2024 | He |
| 2025/0181387 | A1 | 6/2025 | Boshev |

OTHER PUBLICATIONS

U.S. Appl. No. 18/830,939, filed Sep. 11, 2024, Ye Sheng, et al.
U.S. Appl. No. 18/830,963, filed Sep. 11, 2024, Dhruv Deepak Upadhyay, et al.
U.S. Appl. No. 18/830,971, filed Sep. 11, 2024, Ye Sheng, et al.

* cited by examiner

*Primary Examiner* — Jau Shya Meng

(74) *Attorney, Agent, or Firm* — S. Scott Foster; Kowert, Hood, Munyon, Rankin & Goetzel, P.C.

(57) ABSTRACT

A durability marker may be advanced according to ordered batches of log records. Different batches of log records may be sent to a distributed data store to update a log stored in the distributed data store. The different batches may be ordered according to a minimum Log Sequence Number (LSN) value within the different batches. The ordered different batches may be used to determine whether and how much to advance a durability marker for the log.

20 Claims, 13 Drawing Sheets

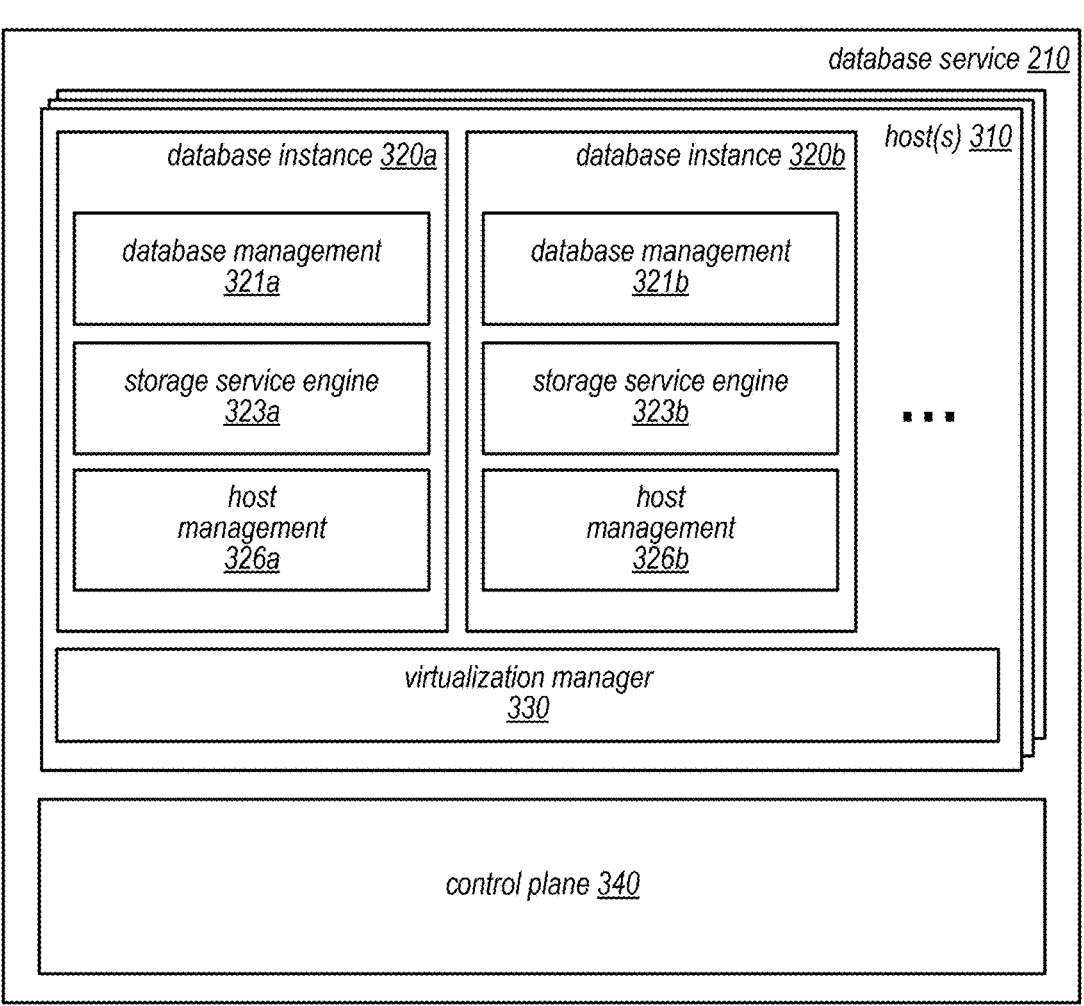
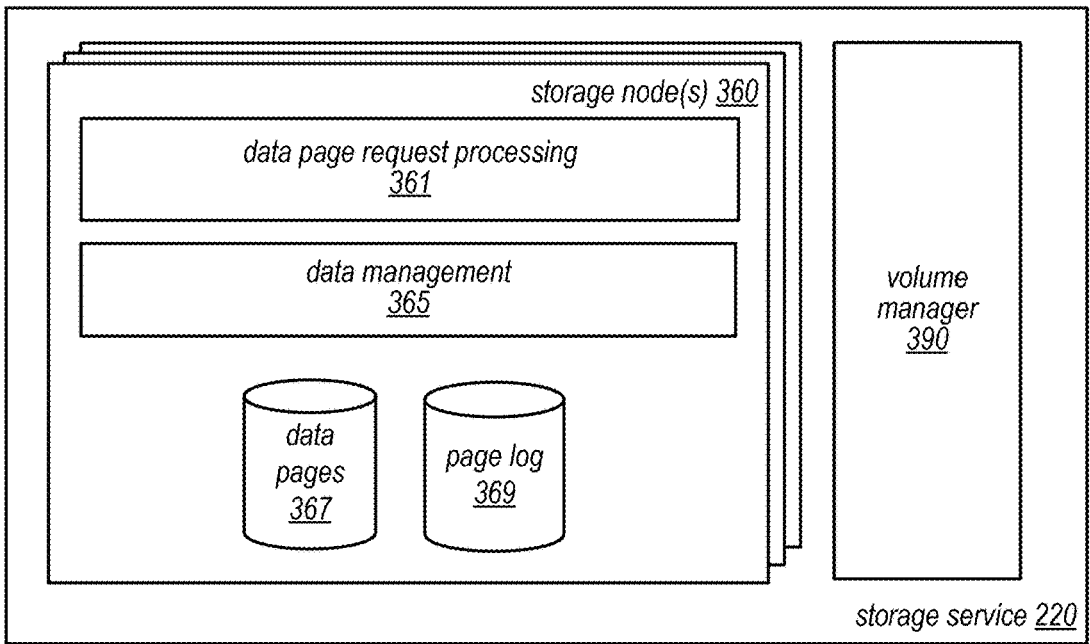
*FIG. 3*

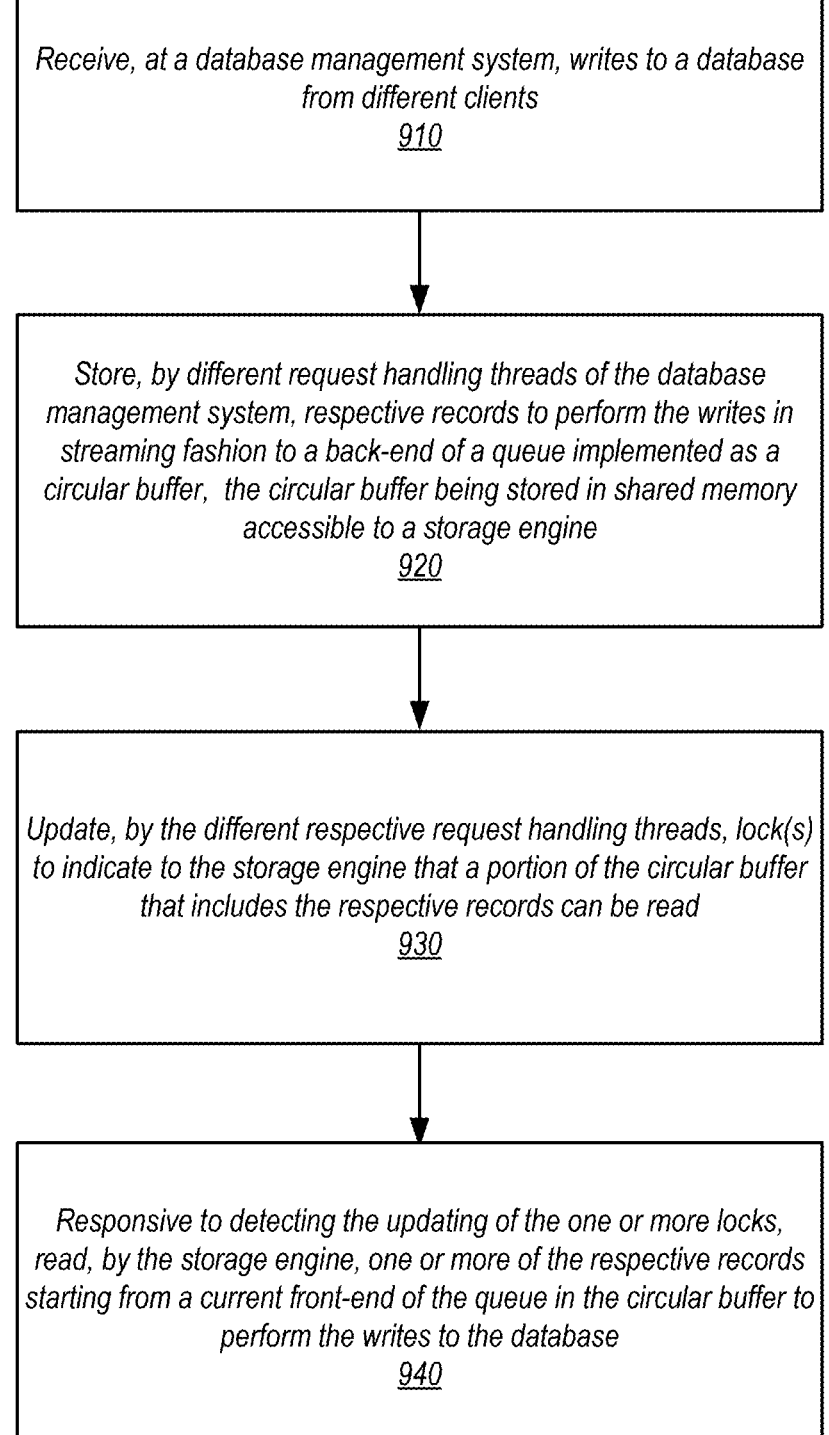

*Receive, at a database management system, writes to a database from different clients*
*910*

*Store, by different request handling threads of the database management system, respective records to perform the writes in streaming fashion to a back-end of a queue implemented as a circular buffer, the circular buffer being stored in shared memory accessible to a storage engine*
*920*

*Update, by the different respective request handling threads, lock(s) to indicate to the storage engine that a portion of the circular buffer that includes the respective records can be read*
*930*

*Responsive to detecting the updating of the one or more locks, read, by the storage engine, one or more of the respective records starting from a current front-end of the queue in the circular buffer to perform the writes to the database*
*940*

*FIG. 9*

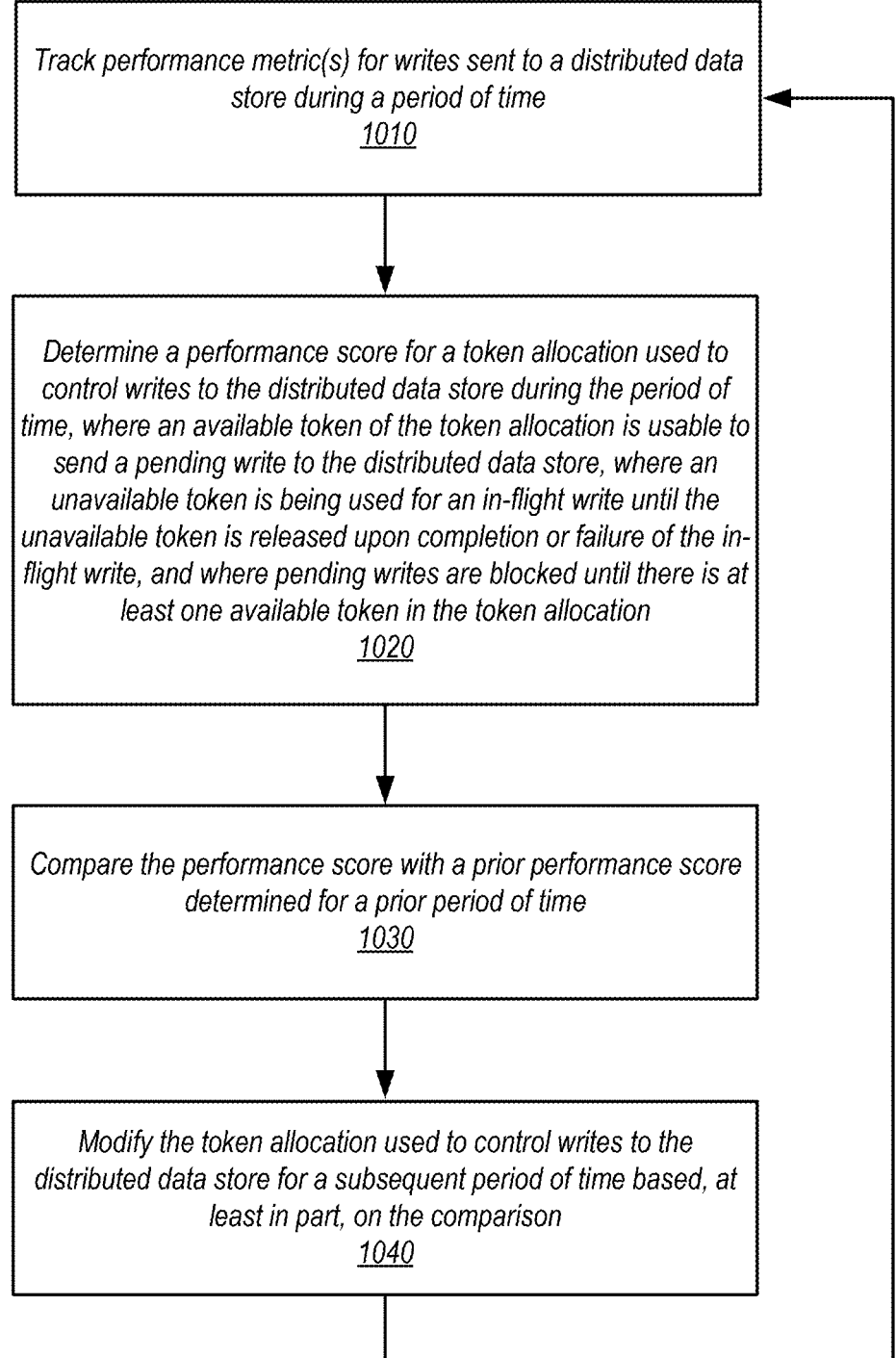

Track performance metric(s) for writes sent to a distributed data store during a period of time
1010

Determine a performance score for a token allocation used to control writes to the distributed data store during the period of time, where an available token of the token allocation is usable to send a pending write to the distributed data store, where an unavailable token is being used for an in-flight write until the unavailable token is released upon completion or failure of the in-flight write, and where pending writes are blocked until there is at least one available token in the token allocation
1020

Compare the performance score with a prior performance score determined for a prior period of time
1030

Modify the token allocation used to control writes to the distributed data store for a subsequent period of time based, at least in part, on the comparison
1040

FIG. 10

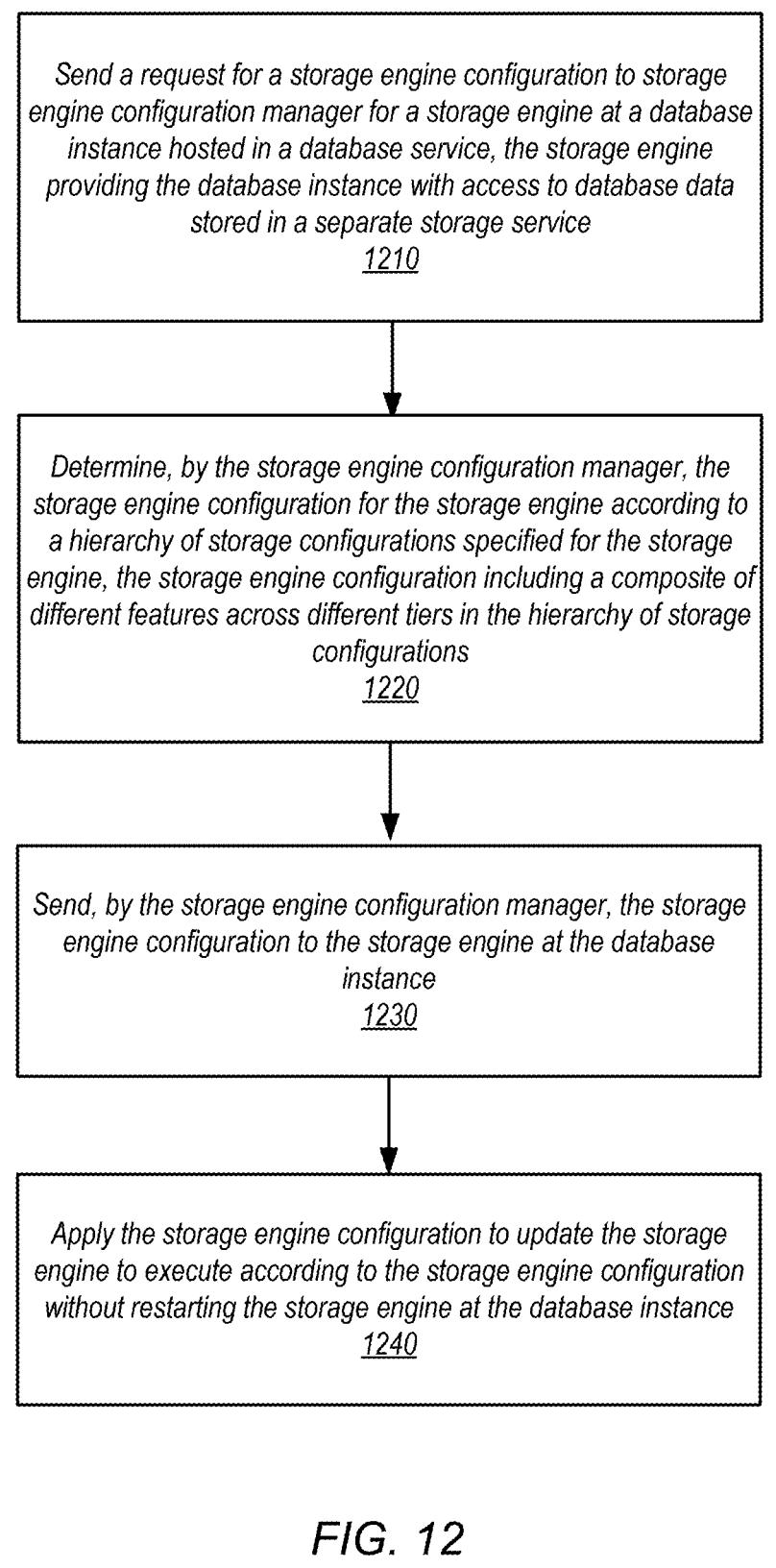

Send a request for a storage engine configuration to storage engine configuration manager for a storage engine at a database instance hosted in a database service, the storage engine providing the database instance with access to database data stored in a separate storage service
1210

Determine, by the storage engine configuration manager, the storage engine configuration for the storage engine according to a hierarchy of storage configurations specified for the storage engine, the storage engine configuration including a composite of different features across different tiers in the hierarchy of storage configurations
1220

Send, by the storage engine configuration manager, the storage engine configuration to the storage engine at the database instance
1230

Apply the storage engine configuration to update the storage engine to execute according to the storage engine configuration without restarting the storage engine at the database instance
1240

*FIG. 12*

ADVANCING A DURABILITY MARKER FOR A LOG ACCORDING TO ORDERED LOG RECORD BATCHES

BACKGROUND

As the technological capacity for organizations to create, track, and retain information continues to grow, a variety of different technologies for managing and storing the rising tide of information have been developed. Database systems, for example, provide clients with many different specialized or customized configurations of hardware and software to manage stored information. However, the increasing amounts of data that organizations must store and manage often correspondingly increases both the size and complexity of data storage and management technologies, like database systems, which in turn escalate the cost of maintaining the information. New technologies more and more seek to reduce both the complexity and storage requirements of maintaining data while simultaneously improving the efficiency of data processing.

For example, data processing is often measured by the speed at which requests to access data are performed. Some types of data access requests require intensive computational and storage access workloads, while other types of data access requests may only involve small amounts of work to process. As data stores may have to process both high and low workload access requests, techniques to perform the different types of access requests may be implemented so that access request processing is optimally performed.

BRIEF DESCRIPTION OF THE DRAWINGS

FIG. 3 is a block diagram illustrating various components of a database service and storage service that provides access to a database, according to some embodiments.

FIG. 9 is a high-level flowchart illustrating various methods and techniques to implement shared memory communication of writes to a storage engine, according to some embodiments.

FIG. 10 is a high-level flowchart illustrating various methods and techniques to implement dynamic token-based traffic control adjustment for a distributed data store, according to some embodiments.

FIG. 12 is a high-level flowchart illustrating various methods and techniques to implement configuration hierarchy for updating storage engine configurations, according to some embodiments.

Figure 1:
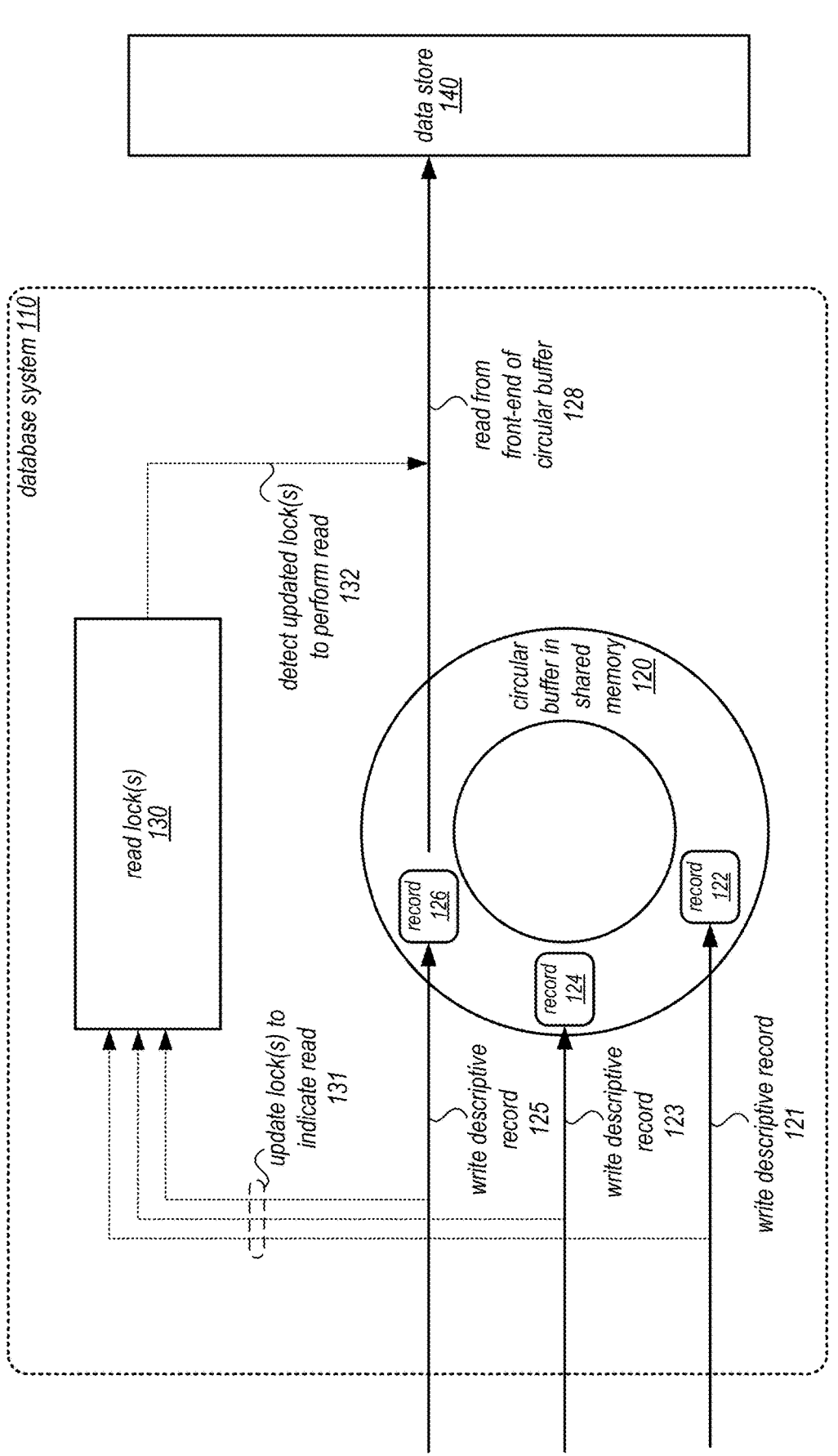
FIG. 1 is a logical block diagram illustrating shared memory communication of writes to a storage engine, according to some embodiments.

While embodiments are described herein by way of example for several embodiments and illustrative drawings, those skilled in the art will recognize that the embodiments are not limited to the embodiments or drawings described. It should be understood, that the drawings and detailed description thereto are not intended to limit embodiments to the particular form disclosed, but on the contrary, the intention is to cover all modifications, equivalents and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). The words "include," "including," and "includes" indicate open-ended relationships and therefore mean including, but not limited to. Similarly, the words "have," "having," and "has" also indicate open-ended relationships, and thus mean having, but not limited to. The terms "first," "second," "third," and so forth as used herein are used as labels for nouns that they precede, and do not imply any type of ordering (e.g., spatial, temporal, logical, etc.) unless such an ordering is otherwise explicitly indicated.

"Based On." As used herein, this term is used to describe one or more factors that affect a determination. This term does not foreclose additional factors that may affect a determination. That is, a determination may be solely based on those factors or based, at least in part, on those factors. Consider the phrase "determine A based on B." While B may be a factor that affects the determination of A, such a phrase does not foreclose the determination of A from also being based on C. In other instances, A may be determined based solely on B.

The scope of the present disclosure includes any feature or combination of features disclosed herein (either explicitly or implicitly), or any generalization thereof, whether or not it mitigates any or all of the problems addressed herein. Accordingly, new claims may be formulated during prosecution of this application (or an application claiming priority thereto) to any such combination of features. In particular, with reference to the appended claims, features from dependent claims may be combined with those of the independent claims and features from respective independent claims may be combined in any appropriate manner and not merely in the specific combinations enumerated in the appended claims.

DETAILED DESCRIPTION OF EMBODIMENTS

For data processing systems, like database systems with write heavy workloads, the time to perform writes to data can significantly impact the performance of applications that utilize the data processing system to manage information. For example, client applications utilize a database system to perform transactions, record updates, store new information in real time and in large numbers. Therefore, in reduction in the time (e.g., latency) to perform writes is highly desirable, as client applications can handle greater workloads or perform at greater speeds.

In some embodiments, a database system may implement a database management system (which is sometimes referred to as a query engine). A database management system may manage the access of one or multiple clients to a database (e.g., one or more database tables, data sets, or other collections of data items). A database management system may implement features, such as transaction handling, coordinating the performance of writes and reads of database data from multiple clients simultaneously, and otherwise ensure that a database data is consistent and durably maintained. Many different types of database systems, including, but not limited to, relational and non-relational database systems, may utilize a database management system in order to manage access to a database.

In some embodiments, a database system may implement a storage engine, which may be responsible for accessing data stored in various data formats. A storage engine may support access to create, read, update, and delete data from a database. To perform different database requests with respect to database data, for instance, a database management system may instruct or request that a storage engine perform writes to a database in order to accomplish the database requests. Accordingly, the interactions between a database management system and a storage engine may be in the "write path" for performing writes to a database. Improvements in the speed at which communications to perform writes between a database management system and a storage engine, may reduce the latency of writes to a database.

For example, some database systems may communicate writes (and other information) through the use of log records exchanged between a database management system and storage engine. A database management system may consolidate log records from different transactions into varying-sized runtime batches before sending them to a storage engine, which ultimately stores or applies them to the database data. This grouping may be performed within runtime code using an algorithm that makes runtime batch size variable. Once formed, the storage engine may prepare these batches for flushing, and determining respective storage locations and/or durability requirements (e.g., protection groups and/or quorum requirements) as well as volume backlinks and other metadata. The use of batching techniques, as described above, may increase the time (latency) of performing writes as the grouping of updates into batches of log records for processing between a database management engine and storage engine can introduce additional overhead and coordination problems, which may be further exacerbated when batch size is variable.

In various embodiments, techniques using shared memory communication of writes to a storage engine may be implemented which can improve the speed at which writes are performed, improving the performance and reducing time for communications between a database management system and storage engine. In various embodiments, as described in detail below, a data structure can be implemented in shared memory allowing multiple writers to write for different database updates or other writes and allowing for a storage engine to efficiently and quickly read from the data structure in order to complete performance of writes to database data. In this way, techniques using shared memory communication of writes to a storage engine using, for example, a circular buffer as described in detail below with regard to FIGS. 1, 5, and 9, can improve the performance of a database system and client applications upon which they depend, as well as other computer-related technologies that make use of database systems.

FIG. 1 is a logical block diagram illustrating shared memory communication of writes to a storage engine, according to some embodiments. Database system 110 may be a database system like a database service discussed below with regard to FIGS. 2-5, or a standalone system that utilizes a shared memory technique to communicate writes descriptive of updates a database stored in data store 140. Further examples of this technique are discussed in detail below with regard to FIGS. 5 and 9. For example, circular buffer in shared memory 120 may be used to store records 122, 124, and 126 that are descriptive of various writes to database data. In at least one embodiment, records, such as records 122, 124, and 126, may be full copies of records, such as log records or other indications of change. In at least one embodiment, records, such as records 122, 134, and 126 may be descriptive of changes by pointing to or identifying other information (e.g., log records, log record payloads, and log record headers) stored elsewhere, as discussed below with regard to FIG. 5.

Because a circular buffer is implemented, reads from the front-end of the circular buffer 128 may be performed while writes are made to the back end of the circular buffer. In this way, writes and reads to perform respective updates can be performed in streaming fashion, increasing write throughput overall. For example, after performing a first one (or more writes), a writing thread of a database management system may continue on to perform further write to the circular buffer, instead of waiting on batching or other operations to organize the writes prior to their communication to a storage engine. Performing writes in streaming fashion may allow a database management system to utilize multiple different threads of execution (e.g., which can be managed independently by a scheduler to increase concurrency of an application, like a database management system).

Although a storage engine may be a separate application (e.g., program or process) from a database management system, shared memory may be used to implement circular buffer 120 that may be accessible by multiple programs or processes (e.g., accessible both by a storage engine and a database management system).

In at least one embodiment, read locks 130, such as futexes, spinning locks, or other synchronization mechanisms, may be updated 131 to indicate a portion of the circular buffer available to be read, which can be detected 132 by a thread (e.g., of a storage engine) which can read 128 from the front-end and update data store 140. In at least one embodiment, read locks 130 may be able to communicate across different programs or processes (e.g., from database management system to storage engine, and vice versa).

Please note, FIG. 1 is provided as a logical illustration of shared memory communication of writes to a storage engine, and are not intended to be limiting as to the physical arrangement, size, or number of components, modules, or devices to implement such features.

Figure 5:
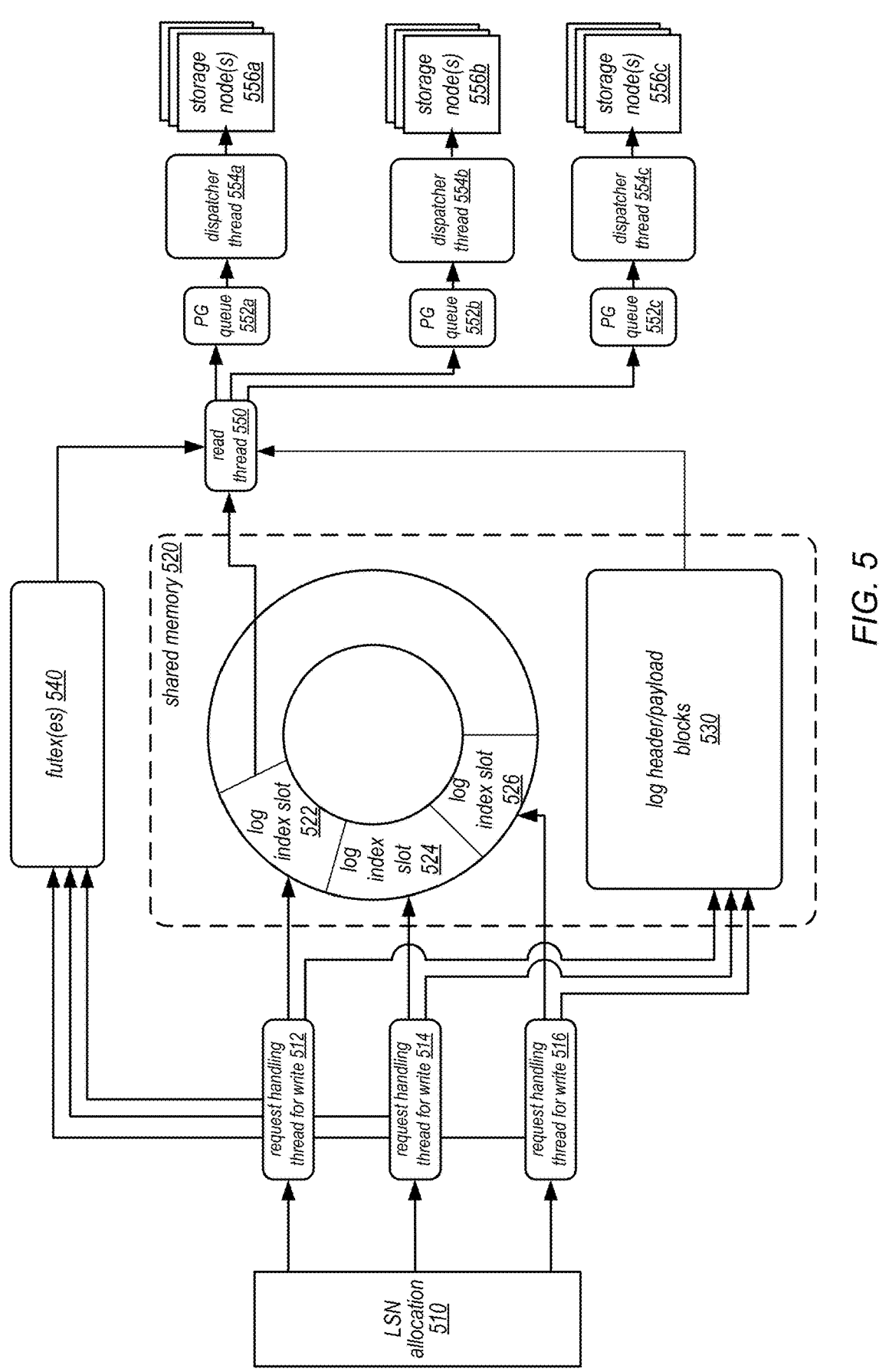
FIG. 5 is a block diagram illustrating shared memory communication of writes to a storage service engine at a database instance, according to some embodiments.

The specification first describes an example network-based database service that performs shared memory communication of writes to a storage engine, discussed in FIGS. 1, 5, and 9, dynamic token-based traffic control adjustment for a distributed data store as discussed with regard to FIGS.

Figure 7:
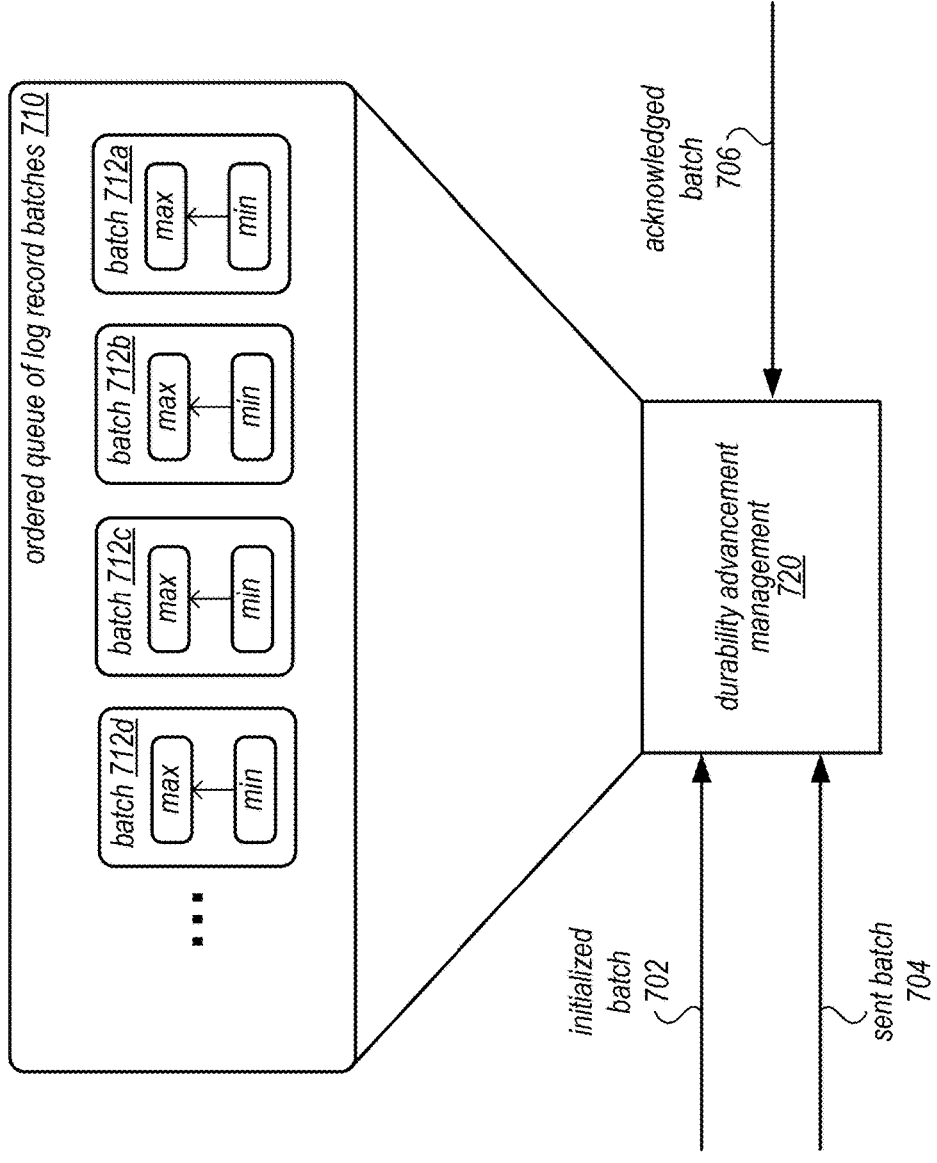
FIG. 7 is a block diagram illustrating interactions for a storage service engine to implement advancing a durability marker for a log according to ordered log record batches, according to some embodiments.
Figure 8:
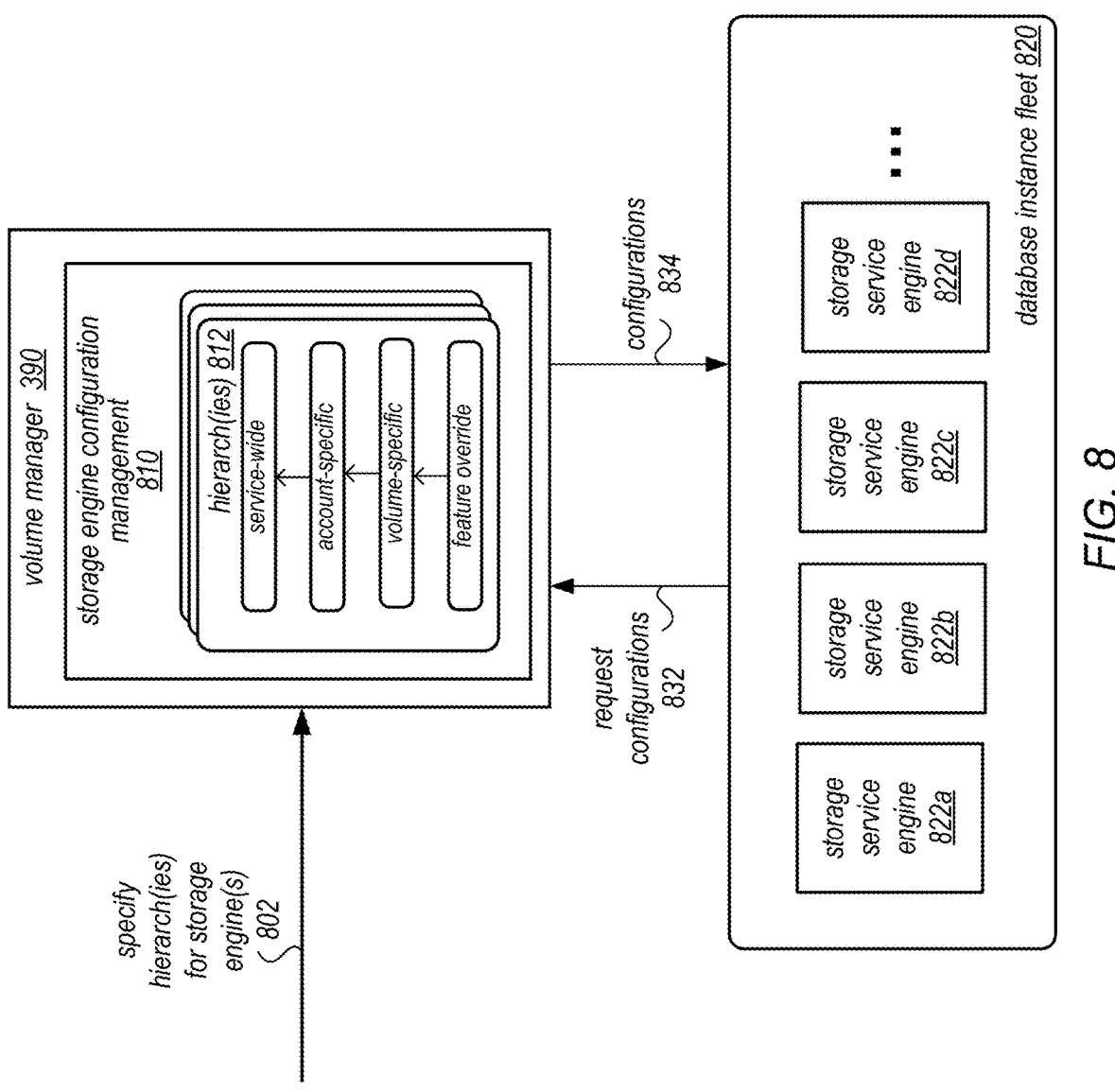
FIG. 8 is a block diagram illustrating interactions with a volume manager and storage service engines to implement configuration hierarchy for updating storage engine configurations, according to some embodiments.
Figure 11:
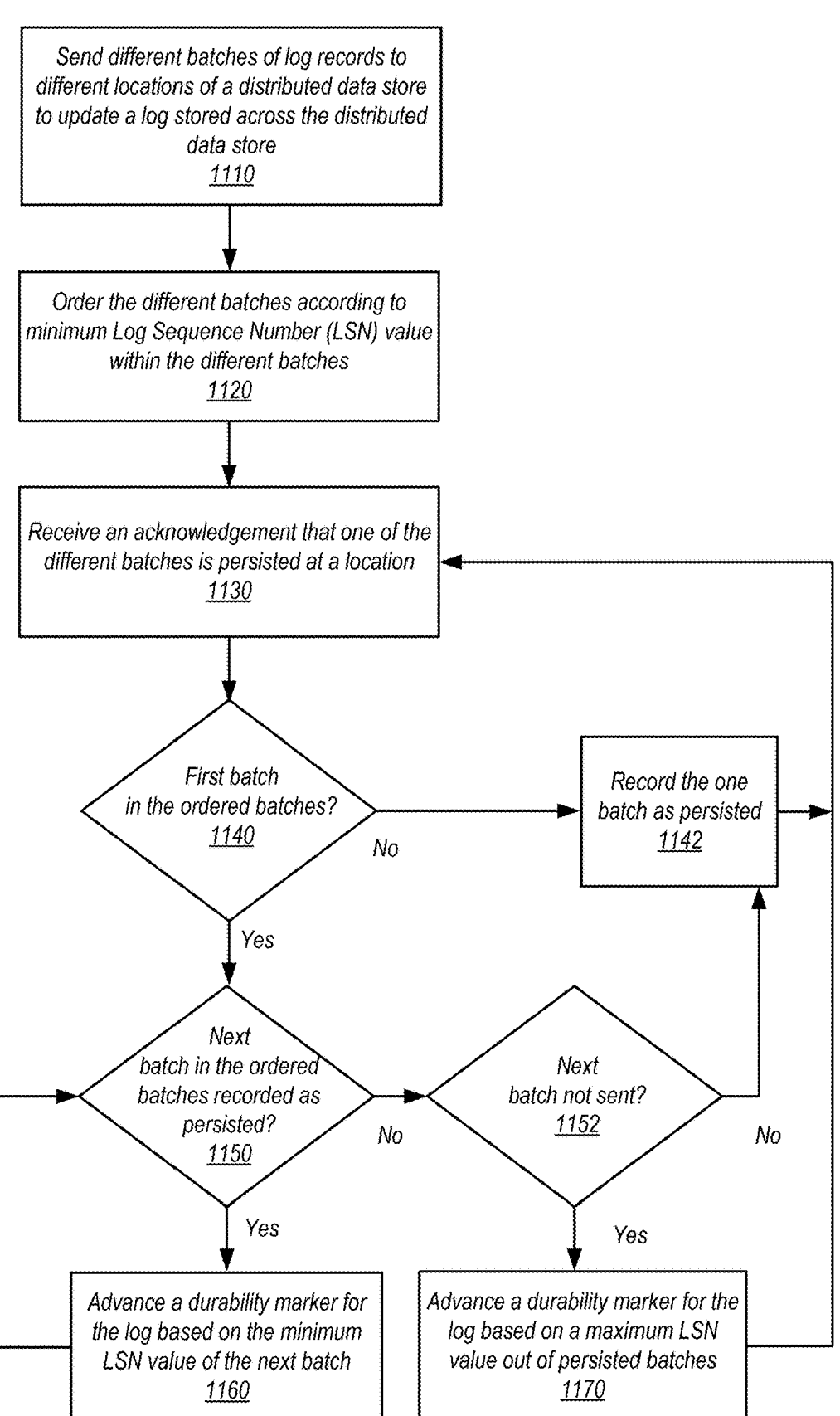
FIG. 11 is a high-level flowchart illustrating various methods and techniques to implement advancing a durability marker for a log according to ordered log record batches, according to some embodiments.

6, and 10, advancing a durability marker for a log according to ordered log record batches as discussed with regard to FIGS. 7 and 11, and/or a configuration hierarchy for updating storage engine configurations as discussed with regard to FIGS. 8 and 12. Included in the description of the example network-based database service are various aspects of the example network-based database service, such as a database instance, and a separate storage service. The specification then describes flowcharts of various embodiments of different methods for shared memory communication of writes to a storage engine, dynamic token-based traffic control adjustment for a distributed data, advancing a durability marker for a log according to ordered log record batches, and a configuration hierarchy for updating storage engine configurations. Next, the specification describes an example system that may implement the disclosed techniques. Various examples are provided throughout the specification.

Figure 2:
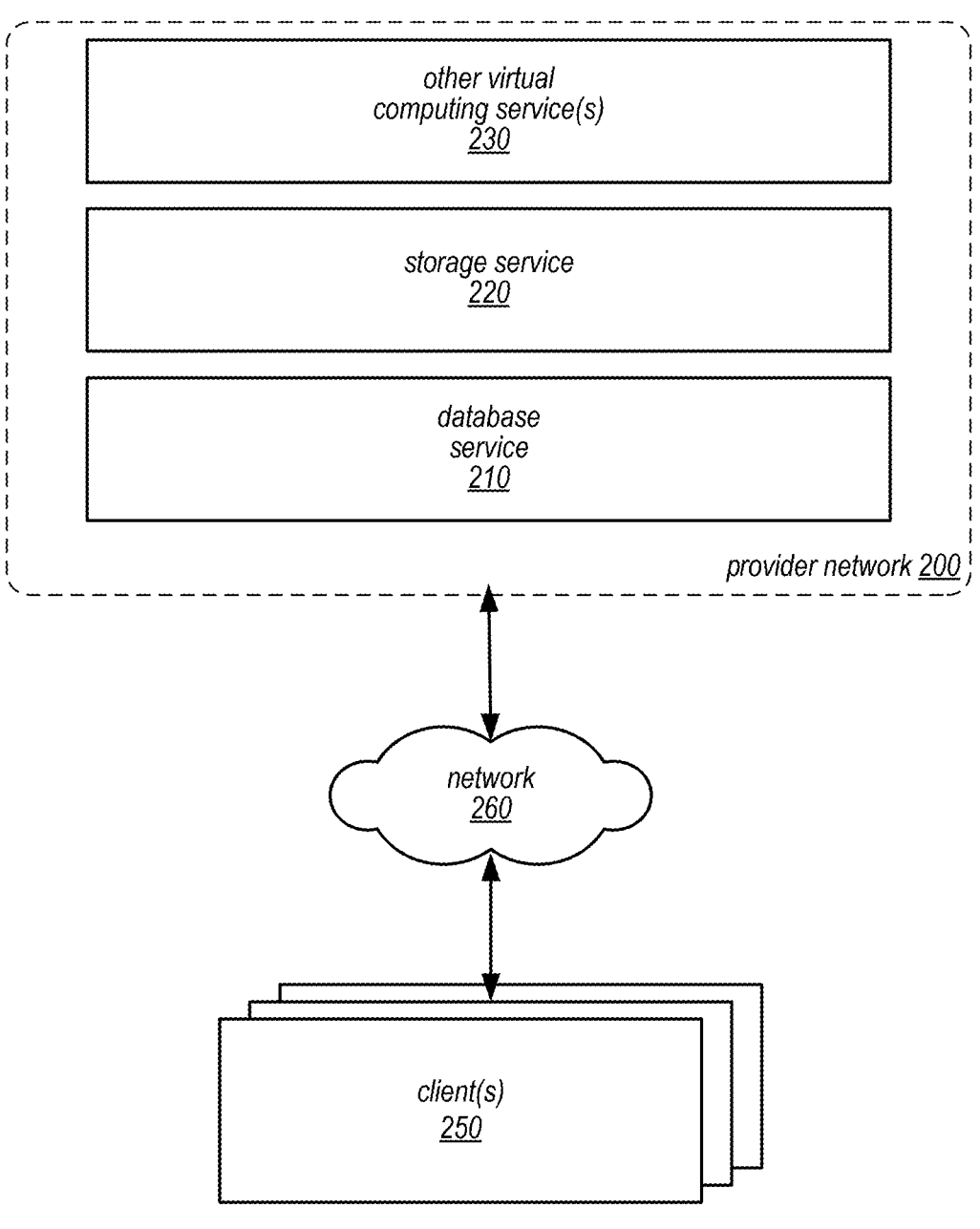
FIG. 2 is a block diagram illustrating a provider network that may implement a database service, according to some embodiments.

FIG. 2 is a block diagram illustrating a provider network that may implement a database service, according to some embodiments. A provider network, such as provider network 200, may be a private or closed system or may be set up by an entity such as a company or a public sector organization to provide one or more services (such as various types of cloud-based storage) accessible via the Internet and/or other networks to clients 250, in some embodiments. The provider network 200 may be implemented in a single location or may include numerous provider network regions that may include one or more data centers hosting various resource pools, such as collections of physical and/or virtualized computer servers, storage devices, networking equipment and the like (e.g., computing system 2000 described below with regard to FIG. 13), needed to implement and distribute the infrastructure and storage services offered by the provider network within the provider network regions 200.

In the illustrated embodiment, a number of clients (shown as clients 250 may interact with a provider network 200 via a network 260. Provider network 200 may implement respective instantiations of the same (or different) services, a database services 210, a storage service 220 and/or one or more other virtual computing service 230 across multiple provider network regions, in some embodiments. It is noted that where one or more instances of a given component may exist, reference to that component herein may be made in either the singular or the plural. However, usage of either form is not intended to preclude the other.

In various embodiments, the components illustrated in FIG. 2 may be implemented directly within computer hardware, as instructions directly or indirectly executable by computer hardware (e.g., a microprocessor or computer system), or using a combination of these techniques. For example, the components of FIG. 2 may be implemented by a system that includes a number of computing nodes (or simply, nodes), each of which may be similar to the computer system embodiment illustrated in FIG. 13 and described below. In various embodiments, the functionality of a given service system component (e.g., a component of the database service or a component of the storage service) may be implemented by a particular node or may be distributed across several nodes. In some embodiments, a given node may implement the functionality of more than one service system component (e.g., more than one database service system component).

Generally speaking, clients 250 may encompass any type of client configurable to submit network-based services requests to provider network region 200 via network 260, including requests for database services. For example, a given client 250 may include a suitable version of a web browser, or may include a plug-in module or other type of code module may execute as an extension to or within an execution environment provided by a web browser. Alternatively, a client 250 (e.g., a database service client) may encompass an application such as a database application (or user interface thereof), a media application, an office application or any other application that may make use of persistent storage resources to store and/or access one or more database tables. In some embodiments, such an application may include sufficient protocol support (e.g., for a suitable version of Hypertext Transfer Protocol (HTTP)) for generating and processing network-based services requests without necessarily implementing full browser support for all types of network-based data. That is, client 250 may be an application may interact directly with provider network 200. In some embodiments, client 250 may generate network-based services requests according to a Representational State Transfer (REST)-style web services architecture, a document- or message-based network-based services architecture, or another suitable network-based services architecture. Although not illustrated, some clients of provider network 200 services may be implemented within provider network 200 (e.g., a client application of database service 210 implemented on one of other virtual computing service(s) 230), in some embodiments. Therefore, various examples of the interactions discussed with regard to clients 250 may be implemented for internal clients as well, in some embodiments.

In some embodiments, a client 250 (e.g., a database service client) may be may provide access to network-based storage of database tables to other applications in a manner that is transparent to those applications. For example, client 250 may be may integrate with an operating system or file system to provide storage in accordance with a suitable variant of the storage models described herein. However, the operating system or file system may present a different storage interface to applications, such as a conventional file system hierarchy of files, directories and/or folders. In such an embodiment, applications may not need to be modified to make use of the storage system service model, as described above. Instead, the details of interfacing to provider network 200 may be coordinated by client 250 and the operating system or file system on behalf of applications executing within the operating system environment.

Clients 250 may convey network-based services requests to and receive responses from provider network 200 via network 260. In various embodiments, network 260 may encompass any suitable combination of networking hardware and protocols necessary to establish network-based communications between clients 250 and provider network 200. For example, network 260 may generally encompass the various telecommunications networks and service providers that collectively implement the Internet. Network 260 may also include private networks such as local area networks (LANs) or wide area networks (WANs) as well as public or private wireless networks. For example, both a given client 250 and provider network 200 may be respectively provisioned within enterprises having their own internal networks. In such an embodiment, network 260 may include the hardware (e.g., modems, routers, switches, load balancers, proxy servers, etc.) and software (e.g., protocol stacks, accounting software, firewall/security software, etc.) necessary to establish a networking link between given client 250 and the Internet as well as between the Internet and provider network 200. It is noted that in some embodiments, clients 250 may communicate with provider network 200 using a private network rather than the public Internet.

For example, clients 250 may be provisioned within the same enterprise as a database service system (e.g., a system that implements database service 210 and/or storage service 220). In such a case, clients 250 may communicate with provider network 200 entirely through a private network 260 (e.g., a LAN or WAN that may use Internet-based communication protocols but which is not publicly accessible).

Generally speaking, provider network 200 may implement one or more service endpoints may receive and process network-based services requests, such as requests to access a database (e.g., queries, inserts, updates, etc.) and/or manage a database (e.g., create a database, configure a database, etc.). For example, provider network 200 may include hardware and/or software may implement a particular endpoint, such that an HTTP-based network-based services request directed to that endpoint is properly received and processed. In one embodiment, provider network 200 may be implemented as a server system may receive network-based services requests from clients 250 and to forward them to components of a system that implements database service 210, storage service 220 and/or another virtual computing service 230 for processing. In other embodiments, provider network 200 may be configured as a number of distinct systems (e.g., in a cluster topology) implementing load balancing and other request management features may dynamically manage large-scale network-based services request processing loads. In various embodiments, provider network 200 may be may support REST-style or document-based (e.g., SOAP-based) types of network-based services requests.

In addition to functioning as an addressable endpoint for clients' network-based services requests, in some embodiments, provider network 200 may implement various client management features. For example, provider network 200 may coordinate the metering and accounting of client usage of network-based services, including storage resources, such as by tracking the identities of requesting clients 250, the number and/or frequency of client requests, the size of data tables (or records thereof) stored or retrieved on behalf of clients 250, overall storage bandwidth used by clients 250, class of storage requested by clients 250, or any other measurable client usage parameter. Provider network 200 may also implement financial accounting and billing systems, or may maintain a database of usage data that may be queried and processed by external systems for reporting and billing of client usage activity. In certain embodiments, provider network 200 may collect, monitor and/or aggregate a variety of storage service system operational metrics, such as metrics reflecting the rates and types of requests received from clients 250, bandwidth utilized by such requests, system processing latency for such requests, system component utilization, such as the target capacity determined for individual database engine head node instances, network bandwidth and/or storage utilization, rates and types of errors resulting from requests, characteristics of stored and databases (e.g., size, data type, etc.), or any other suitable metrics. In some embodiments such metrics may be used by system administrators to tune and maintain system components, while in other embodiments such metrics (or relevant portions of such metrics) may be exposed to clients 250 to enable such clients to monitor their usage of database service 210, storage service 220 and/or another virtual computing service 230 (or the underlying systems that implement those services).

In some embodiments, provider network 200 may also implement user authentication and access control procedures. For example, for a given network-based services request to access a particular database table, provider network 200 ascertain whether the client 250 associated with the request is authorized to access the particular database table. Provider network 200 may determine such authorization by, for example, evaluating an identity, password or other credential against credentials associated with the particular database table, or evaluating the requested access to the particular database table against an access control list for the particular database table. For example, if a client 250 does not have sufficient credentials to access the particular database table, provider network 200 may reject the corresponding network-based services request, for example by returning a response to the requesting client 250 indicating an error condition. Various access control policies may be stored as records or lists of access control information by database service 210, storage service 220 and/or other virtual computing services 230.

Note that in many of the examples described herein, services, like database service 210 or storage service 220 may be internal to a computing system or an enterprise system that provides database services to clients 250, and may not be exposed to external clients (e.g., users or client applications). In such embodiments, the internal "client" (e.g., database service 210) may access storage service 220 over a local or private network (e.g., through an API directly between the systems that implement these services). In such embodiments, the use of storage service 220 in storing database tables on behalf of clients 250 may be transparent to those clients. In other embodiments, storage service 220 may be exposed to clients 250 through provider network region 200 to provide storage of database tables or other information for applications other than those that rely on database service 210 for database management. In such embodiments, clients of the storage service 220 may access storage service 220 via network 260 (e.g., over the Internet). In some embodiments, a virtual computing service 230 may receive or use data from storage service 220 (e.g., through an API directly between the virtual computing service 230 and storage service 220) to store objects used in performing computing services 230 on behalf of a client 250. In some cases, the accounting and/or credentialing services of provider network region 200 may be unnecessary for internal clients such as administrative clients or between service components within the same enterprise.

Note that in various embodiments, different storage policies may be implemented by database service 210 and/or storage service 220. Examples of such storage policies may include a durability policy (e.g., a policy indicating the number of instances of a database table (or data page thereof, such as a quorum-based policy) that will be stored and the number of different nodes on which they will be stored) and/or a load balancing policy (which may distribute database tables, or data pages thereof, across different nodes, volumes and/or disks in an attempt to equalize request traffic). In addition, different storage policies may be applied to different types of stored items by various one of the services. For example, in some embodiments, storage service 220 may implement a higher durability for redo log records than for data pages.

FIG. 3 is a block diagram illustrating various components of a database service and storage service that provides access to a database, according to some embodiments. Database service 210 may implement control plane 340 which may manage the creation, provisioning, deletion, or other features of managing a database hosted in database service 210. For example, control plane 340 may monitor the performance of host(s) 310 (e.g., a computing system or device like computing system 2000 discussed below with regard to FIG. 13) for high workloads (e.g., heat) and move or redirect placement of database engine head node instances away from some hosts to avoid overburdening host(s) 310. Control plane 340 may handle various management requests, such as request to create databases, manage databases (e.g., by configuring or modifying performance, such as by enabling a "serverless" or other automated management feature in response to a request which may cause resource scaling to be enabled for that database. For example, control plane 340 may implement dynamic host scaling to automatically scale cache sizes for a database system or other computing resource allocations for a database system. Control plane 340 may direct placement of database instances 320 on host(s) 310 so as to distribute workload across host(s) 310 to avoid failure scenarios, like out-of-memory.

Database service 210 may implement one or more different types of database systems with respective types of database management systems for accessing database data as part of the database. For example, database service 210 may implement various types of connection-based (e.g., having established a network connection between a database client and database engine head node 320) database systems which may, for instance, facilitate the performance of various operations that continue over multiple communications between the database client and the connected database instances 320. In at least some embodiments, database service 210 may be a relational database service that hosts relational databases on behalf of clients.

Database service 210 may implement a fleet of host(s) 310 which may provide, in various embodiments, a multi-tenant configuration so that different database instances, such as database instances 320a and 320b, can be hosted on the same host 310, but provide access to different databases on behalf of different clients over different connections. While hosts(s) 310 may be multi-tenant, each database instance 320 may be provisioned on host(s) 310 in order to implement scaling (e.g., by overprovisioning resources initially and then scaling-based on workload to right-size the capacity that it is recorded as utilized for an account that owns or is associated with the database that is accessed by the database instance node 320).

In various embodiments, host(s) 310 may implement a virtualization technology, such as virtual machine based virtualization, wherein database engine head node instances 320 may be different respective virtual machines, micro virtual machines (microVMs) which may offer a reduced or light-weight virtual machine implementation that retains use of individual kernels within a microVM, or containers which offer virtualization of an operating system using a shared kernel. Host(s) 310 may implement virtualization manager 330, which may support hosting one or multiple separate database engine head node instances 320 as different respective VMs, microVMs, or containers. Virtualization manager 330 may support increasing or decreasing resources made available to host(s) 310 to use for other tasks (including other database instance(s) 320) that were allocated to a database instance 320 upon creation at host(s) 310.

Database instance(s) 320 may support various features for accessing a database, such as database management 321a and 321b (e.g., which may be a database management system (DBMS)), and storage service engine(s) 323a and 323b discussed in detail below with regard to FIG. 4. Database instances 320 may implement agents, interfaces, or other controls according to the respective type of virtualization used to collect and facilitate communication of utilization metrics for scaling, among other supported aspects of virtualization, such as host management 326a and 326b.

In some embodiments, database data for a database of database service 210 may be stored in a separate storage service 220. In some embodiments, storage service 220 may be implemented as to store database data as virtual disk or other persistent storage drives. In other embodiments, embodiments, storage service 220 may store data for databases using log-structured storage.

For example, data may be organized in various logical volumes, segments, and data pages for storage on one or more storage nodes 360 of storage service 220. For example, in some embodiments, each database may be represented by a logical volume, and each logical volume may be segmented over a collection of storage nodes 360. Each segment, which may live on a particular one of the storage nodes, may contain a set of contiguous block addresses, in some embodiments. In some embodiments, each segment may store a collection of one or more data pages and a change log (also referred to as a redo log) (e.g., a log of redo log records) for each data page that it stores. Storage nodes 360 may receive redo log records and to coalesce them to create new versions of the corresponding data pages and/or additional or replacement log records (e.g., lazily and/or in response to a request for a data page or a database crash). In some embodiments, data pages and/or change logs may be mirrored across multiple storage nodes, according to a variable configuration (which may be specified by the client on whose behalf the databases is being maintained in the database system). For example, in different embodiments, one, two, or three copies of the data or change logs may be stored in each of one, two, or three different availability zones or regions, according to a default configuration, an application-specific durability preference, or a client-specified durability preference.

In some embodiments, a volume may be a logical concept representing a highly durable unit of storage that a user/client/application of the storage system understands. A volume may be a distributed store that appears to the user/client/application as a single consistent ordered log of write operations to various user pages of a database, in some embodiments. Each write operation may be encoded in a log record (e.g., a redo log record), which may represent a logical, ordered mutation to the contents of a single user page within the volume, in some embodiments. Each log record may include a unique identifier (e.g., a Log Sequence Number (LSN)), in some embodiments. Each log record may be persisted to one or more synchronous segments in the distributed store that form a Protection Group (PG), to provide high durability and availability for the log record, in some embodiments. A volume may provide an LSN-type read/write interface for a variable-size contiguous range of bytes, in some embodiments.

In some embodiments, a volume may consist of multiple extents, each made durable through a protection group. In such embodiments, a volume may represent a unit of storage composed of a mutable contiguous sequence of volume extents. Reads and writes that are directed to a volume may be mapped into corresponding reads and writes to the constituent volume extents. In some embodiments, the size of a volume may be changed by adding or removing volume extents from the end of the volume.

In some embodiments, a segment may be a limited-durability unit of storage assigned to a single storage node. A segment may provide a limited best-effort durability (e.g., a persistent, but non-redundant single point of failure that is a storage node) for a specific fixed-size byte range of data, in some embodiments. This data may in some cases be a mirror of user-addressable data, or it may be other data, such as volume metadata or erasure coded bits, in various embodiments. A given segment may live on exactly one storage node, in some embodiments. Within a storage node, multiple segments may live on each storage device (e.g., an SSD), and each segment may be restricted to one SSD (e.g., a segment may not span across multiple SSDs), in some embodiments. In some embodiments, a segment may not be required to occupy a contiguous region on an SSD; rather there may be an allocation map in each SSD describing the areas that are owned by each of the segments. As noted above, a protection group may consist of multiple segments spread across multiple storage nodes, in some embodiments. In some embodiments, a segment may provide an LSN-type read/write interface for a fixed-size contiguous range of bytes (where the size is defined at creation). In some embodiments, each segment may be identified by a segment UUID (e.g., a universally unique identifier of the segment).

In some embodiments, a data page may be a block of storage, generally of fixed size. In some embodiments, each data page may be a block of storage (e.g., of virtual memory, disk, or other physical memory) of a size defined by the operating system, and may also be referred to herein by the term "data block". A data page may be a set of contiguous sectors, in some embodiments. A data page may serve as the unit of allocation in storage devices, as well as the unit in log pages for which there is a header and metadata, in some embodiments. In some embodiments, the term "page" or "storage page" may be a similar block of a size defined by the database configuration, which may typically a multiple of 2, such as 4096, 8192, 16384, or 32768 bytes.

In some embodiments, storage nodes 360 of storage service 220 may perform some database system responsibilities, such as the updating of data pages for a database, and in some instances perform some query processing on data. As illustrated in FIG. 3, storage node(s) 360 may implement data page request processing 361, and data management 365 to implement various ones of these features with regard to the data pages 367 and page log 369 of redo log records among other database data in a database volume stored in log-structured storage service. For example, data management 365 may perform at least a portion of any or all of the following operations: replication (locally, e.g., within the storage node), coalescing of redo logs to generate data pages, snapshots (e.g., creating, restoration, deletion, etc.), clone volume creation, log management (e.g., manipulating log records), crash recovery, and/or space management (e.g., for a segment). Each storage node may also have multiple attached storage devices (e.g., SSDs) on which data blocks may be stored on behalf of clients (e.g., users, client applications, and/or database service subscribers), in some embodiments. Data page request processing 361 may handle requests to return data pages of records from a database volume, and may perform operations to coalesce redo log records or otherwise generate a data pages to be returned responsive to a request.

In at least some embodiments, storage nodes 360 may provide multi-tenant storage so that data stored in part or all of one storage device may be stored for a different database, database user, account, or entity than data stored on the same storage device (or other storage devices) attached to the same storage node. Various access controls and security mechanisms may be implemented, in some embodiments, to ensure that data is not accessed at a storage node except for authorized requests (e.g., for users authorized to access the database, owners of the database, etc.).

Figure 4:
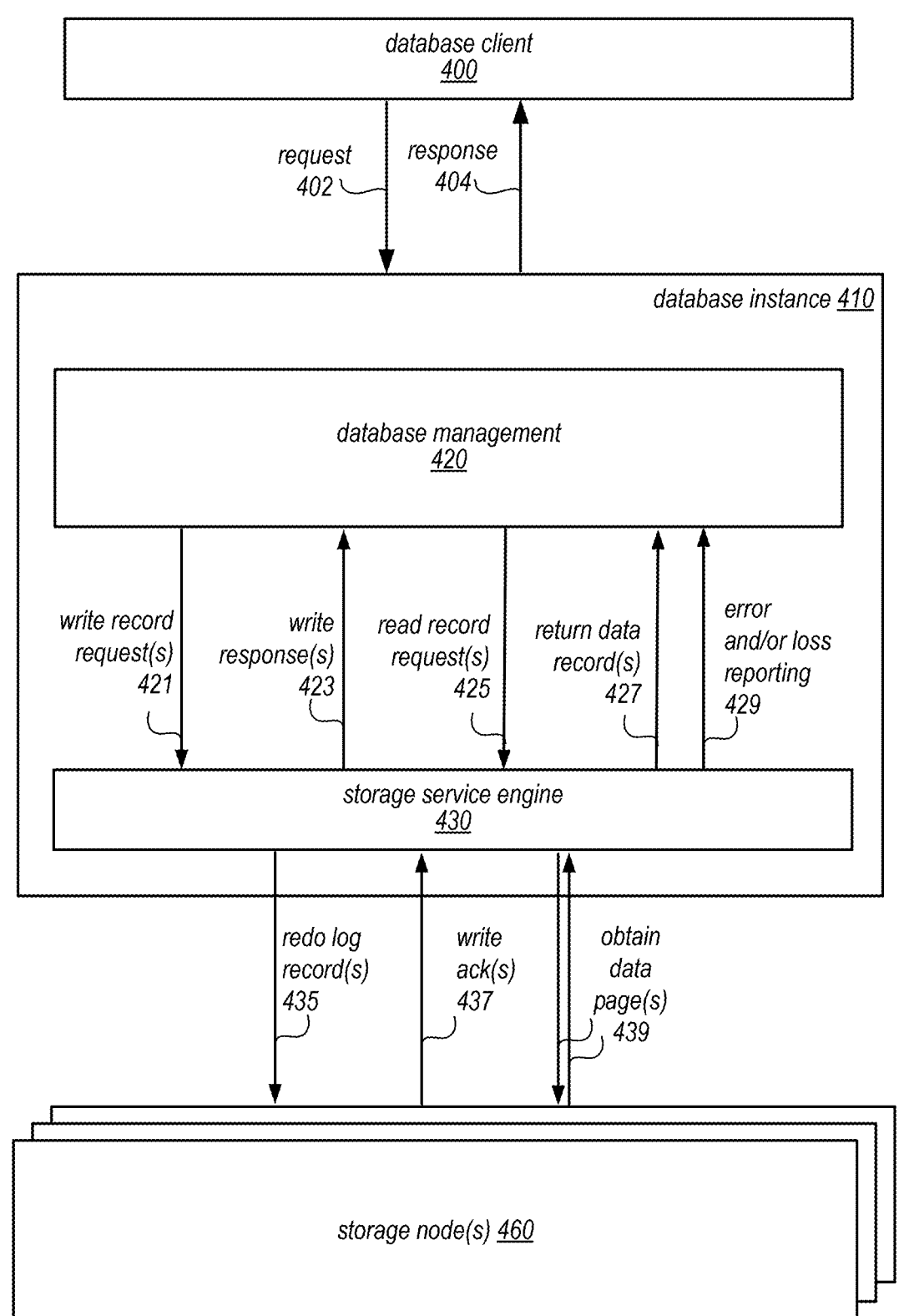
FIG. 4 is a block diagram illustrating various interactions to handle database client requests, according to some embodiments.

FIG. 4 is a block diagram illustrating various interactions to handle database client requests, according to some embodiments. In the example database system implemented as part of database service 210, a database instance 410 may be implemented for each database and storage nodes 460 (which may or may not be visible to the clients of the database system and may be similar to storage nodes 360 discussed above with regard to FIG. 3). Clients of a database may access a database instance 410 directly in some embodiments via network utilizing various database access protocols (e.g., Java Database Connectivity (JDBC) or Open Database Connectivity (ODBC)). However, storage nodes 460, which may be employed by the database service 210 to store data pages of one or more databases (and redo log records and/or other metadata associated therewith) on behalf of clients, and to perform other functions of the database system as described herein, may or may not be network-addressable and accessible to database clients directly, in different embodiments. For example, in some embodiments, storage nodes 460 may perform various storage, access, change logging, recovery, log record manipulation, and/or space management operations in a manner that is invisible to clients of a database engine head node 410.

As previously noted, a database instance 410 may implements a database system, or portion thereof, (which may include database management 420 and storage service engine 430), in some embodiments. Database management 420 may receive requests, like request 412, which may include queries or other requests such as updates, deletions, etc., from resources a proxy connected to a database client 400 which first received the request 402 from the database client 400 (not illustrated) or directly from database client 400 (as illustrated). Implementing a proxy between database client 400 and database instance 410 may allow for database service 210 to change out database instances (e.g., to scale to larger or smaller database instances in order to increase or decrease hardware capacities for the database or to handle failure without causing an interrupt to database client) as part of various scaling events as discussed below. Database management 420 then parses them, optimizes them, and develops a plan to carry out the associated database operation(s).

Database management 420 may return a response 414 to the request (e.g., results to a query) which proxy 410 may provide as response 404 to database client 400, which may include write acknowledgements, requested data (e.g., records or other results of a query), error messages, and or other responses, as appropriate. As illustrated in this example, database instance 410 may also include a storage service engine 430 (or client-side driver), which may route read requests and/or redo log records to various storage nodes 460 within storage service 220, receive write acknowledgements from storage nodes 460, receive requested data pages from storage nodes 460, and/or return data pages, error messages, or other responses to query engine 420 (which may, in turn, return them to a database client).

Database management 420 may be responsible for providing transactionality and consistency in the database of which instance 410 is a component. For example, this component may be responsible for ensuring the Atomicity, Consistency, and Isolation properties of the database and the transactions that are directed that the database instance, such as determining a consistent view of the database applicable for a query, applying undo log records to generate prior versions of tuples of a database. Database management 420 may manage an undo log to track the status of various transactions and roll back any locally cached results of transactions that do not commit.

For example, a request 412 that includes a request to write to a page may be parsed and optimized to generate one or more write record requests 421, which may be sent to storage service engine 430 for subsequent routing to log-structured storage service 450. In this example, storage service engine 430 may generate one or more redo log records 435 corresponding to each write record request 421, and may send them to specific ones of the storage nodes 460 of storage service 220. Storage nodes 460 may return a corresponding write acknowledgement 437 for each redo log record 435 (or batch of redo log records) to database instance 410 (specifically to storage service engine 430). Storage service engine 430 may pass these write acknowledgements to database management 420 (as write responses 423), which may then send corresponding responses (e.g., write acknowledgements) to one or more clients as a response 414.

In another example, a request that is a query may cause data pages to be read and returned to database management 420 for evaluation. For example, a query could cause one or more read record requests 425, which may be sent to storage service engine 430 for subsequent routing to storage nodes 460. In this example, storage service engine 430 may send these requests to specific ones of the storage nodes 460, and storage nodes 460 may return the requested data pages 439 to database instance 410 (specifically to storage service engine 430). Storage service engine 430 may send the returned data pages to database management 420 as return data records 427, and database management 420 may then evaluate the content of the data pages in order to determine or generate a result of a query sent as a response 414.

In some embodiments, various error and/or data loss messages 441 may be sent from log-structured storage service 450 to database instance 410 (specifically to storage service engine 430). These messages may be passed from storage service engine 430 to database management 420 as error and/or loss reporting messages 429, and then to one or more clients as a response 414.

In some embodiments, the APIs 435-439 to access storage nodes 460 and the APIs 421-429 of storage service engine 430 may expose the functionality of storage service 220 to database instance 410 as if database instance 410 were a client of storage service 220. For example, database instance 410 (through storage service engine 430) may write redo log records or request data pages through these APIs to perform (or facilitate the performance of) various operations of the database system implemented by the combination of database instance 410 and storage nodes 460 (e.g., storage, access, change logging, recovery, and/or space management operations).

Note that in various embodiments, the API calls and responses between database instance 410 and storage nodes 460 (e.g., APIs 421-429) and/or the API calls and responses between storage service engine 430 and database management 420 (e.g., APIs 435-439) in FIG. 4 may be performed over a secure proxy connection (e.g., one managed by a gateway control plane), or may be performed over the public network or, alternatively, over a private channel such as a virtual private network (VPN) connection. These and other APIs to and/or between components of the database systems described herein may be implemented according to different technologies, including, but not limited to, Simple Object Access Protocol (SOAP) technology and Representational state transfer (REST) technology. For example, these APIs may be, but are not necessarily, implemented as SOAP APIs or RESTful APIs. SOAP is a protocol for exchanging information in the context of Web-based services. REST is an architectural style for distributed hypermedia systems. A RESTful API (which may also be referred to as a RESTful web service) is a web service API implemented using HTTP and REST technology. The APIs described herein may in some embodiments be wrapped with client libraries in various languages, including, but not limited to, C, C++, Java, C# and Perl to support integration with database engine head node 410 and/or storage nodes 460.

As discussed in detail below, various interactions with a storage service engine, including the communication of writes to a storage service engine and the performance of writes by a storage service engine to storage nodes may take advantage of the various techniques described in detail below with regard to FIGS. 5-12. For example, FIG. 5, may provide a detailed example of interactions to perform write record requests 421 and communicate write responses 423 using shared memory communications. Additionally, information such as durability markers for a log (e.g., a Volume Durability LSN (VDL)) and/or other information provided by or determined using the below techniques may also be exchanged or used by database management 420 even if not explicitly illustrated and discussed above, in some embodiments.

FIG. 5 is a block diagram illustrating shared memory communication of writes to a storage service engine at a database instance, according to some embodiments. As indicated at 510, LSN allocation may be performed for handling writes from different request handling threads 512, 514, and 516. LSN values allocated may be monotonically increasing and given in groups (e.g., 3 to 6 LSNs), in some embodiments. Request handling write threads 512 may write a requests to corresponding log index slots 522, 524, and 526, which may store log index records that point to the separate log headers and payload data stored in blocks 530. In this way, a circular buffer can store a large number of log records, allowing streaming writes by threads to continue.

Read thread 550 may detect when a request handling thread for a write is finished with a slot by performing a wake operation on a futex lock, which indicates to read thread 550 that it can obtain log record indexes from the slot, obtain the appropriate information from blocks 530, in order to queue the log records for flushing to storage via different PG queues, 552a, 552b, and 552c, each of which may be serviced by dispatcher threads 554a, 554b, and 554c to send requests to storage node(s) 556a, 556b, and 556c.

For example, in at least some embodiments, the techniques illustrated above with respect to FIG. 5 may be implemented using a LogStream technique. In this example, there may be a LogStream queue (e.g., the queue illustrated in shared memory 520), LogStreamBlocks (LSB) (e.g., blocks 530) that are used to store log record headers and paylods, and a LogStreamIndex (LSI) (e.g., log index records in slots 522, 524, and 526) that will store shared memory metadata and manage the notification system between a database management system implementing request handling threads 512, 514, and 516, and a storage engine implementing read thread 550 and dispatcher threads 554a, 554b, and 554c.

In the above example embodiment, LogStream different interface commands (e.g., APIs) may be used, such as allocateLsns, stream Write, and streamRead. The interface command allocateLsns may be managed by an atomic operation that multiple engine writers (e.g., request handling threads 512, 514, and 516) can call in order to obtain LSNs for each writer's respective writes. The interface command streamWrite may be invoked to write log records and their payloads to shared memory 520 in addition to notifying a storage service engine (e.g., read thread 550) that it can begin reading.

Continuing with the above example embodiment, the LogStreamIndex may be implemented as a circular array with a large number of slots (e.g., one million slots) in which an index value may be determined by an LSN modulo (%) the number of slots (e.g., LSN % 1,000,000). In some embodiments, the number of slots may correspond to a number of in-flight writes that may be allowed. A slot (e.g., log index slots 522, 524, and 526) may contain metadata about the log records that the storage service engine will need to use to retrieve the headers and payloads from the LogStreamBlock they were written to. In one embodiment, each call to streamWrite may have a thread write to one slot per LSN. After the request handling thread for a write request has filled out all of the slot information, it will then copy out all of the log record headers and payloads to the LSB. A status field may then be seat to ready and a FUTEX wake called on a global futex (e.g., futex(es) if it detects that a storage engine is currently waiting on this LSN. Each call to streamWrite may also increase a refcount on the LSB it is using by the number LSNs written. Once a VDL has advanced past the highest LSN in that LSB (e.g., according to the techniques discussed below with regard to FIGS. 7 and 11), storage service engine may free the LSB to be reused later.

Continuing with the above example embodiment, a storage service engine will host a polling thread (e.g., read thread 550) that will be responsible for pulling log records from the shared memory 520 after request handling thread(s) populate them. The polling thread may calculate the slot it will need to wait on based on the number of LSNs it has read previously. If the slot is not marked as ready the polling thread will call a FUTEX wait on the LogStream queue's global FUTEX. Every time the polling thread detects that the slot's status to ready or it is woken up on the FUTEX, it will read out metadata from the slot. Based on the number of LSNs field populated in the slot, the polling thread will check the next slot until it finds a Slot is not ready OR until an upper limit of the number of LSNs to read (e.g., 1024) is reached. After determining all of the log records, the polling thread will start reading log records from the LSBs. Given the information in the LogRecordHeaders, the polling thread may allocate the Volume and PG backlinks, reserve slots in the respective PG Buffers (e.g., PG queues 552a, 552b, and 552c), and then hand off pointers to the log records to storage service engine worker threads (e.g., dispatcher threads 554a, 554b, and 554c).

While batching may be avoided using shared memory to write updates as log records to a circular buffer in streaming fashion, batching may be performed to obtain writes from a PG queue and send them to a group of storage nodes (as discussed below with regard to FIGS. 7 and 11).

Once writes are ready to be sent by a storage service engine to a data store (e.g., storage service 230), different traffic control mechanisms may be implemented to ensure that the writes are efficiently performed. Unlike some traffic control techniques which overemphasize reducing latency at the cost of throughput, database systems may be equally (or more) concerned with write throughput in order to provide good performance for client applications. Therefore, traffic control techniques that can improve throughput performance may be highly desirable. For example, as discussed in detail below with regard to FIGS. 6 and 10, dynamic token-based traffic control adjustment for a storage engine, may determine and enforce an optimal traffic control mechanism through a dynamically managed allocation of tokens that ensures optimal throughput and latency performance, improving the performance of a database system, as well as other computer-related technologies.

Figure 6:
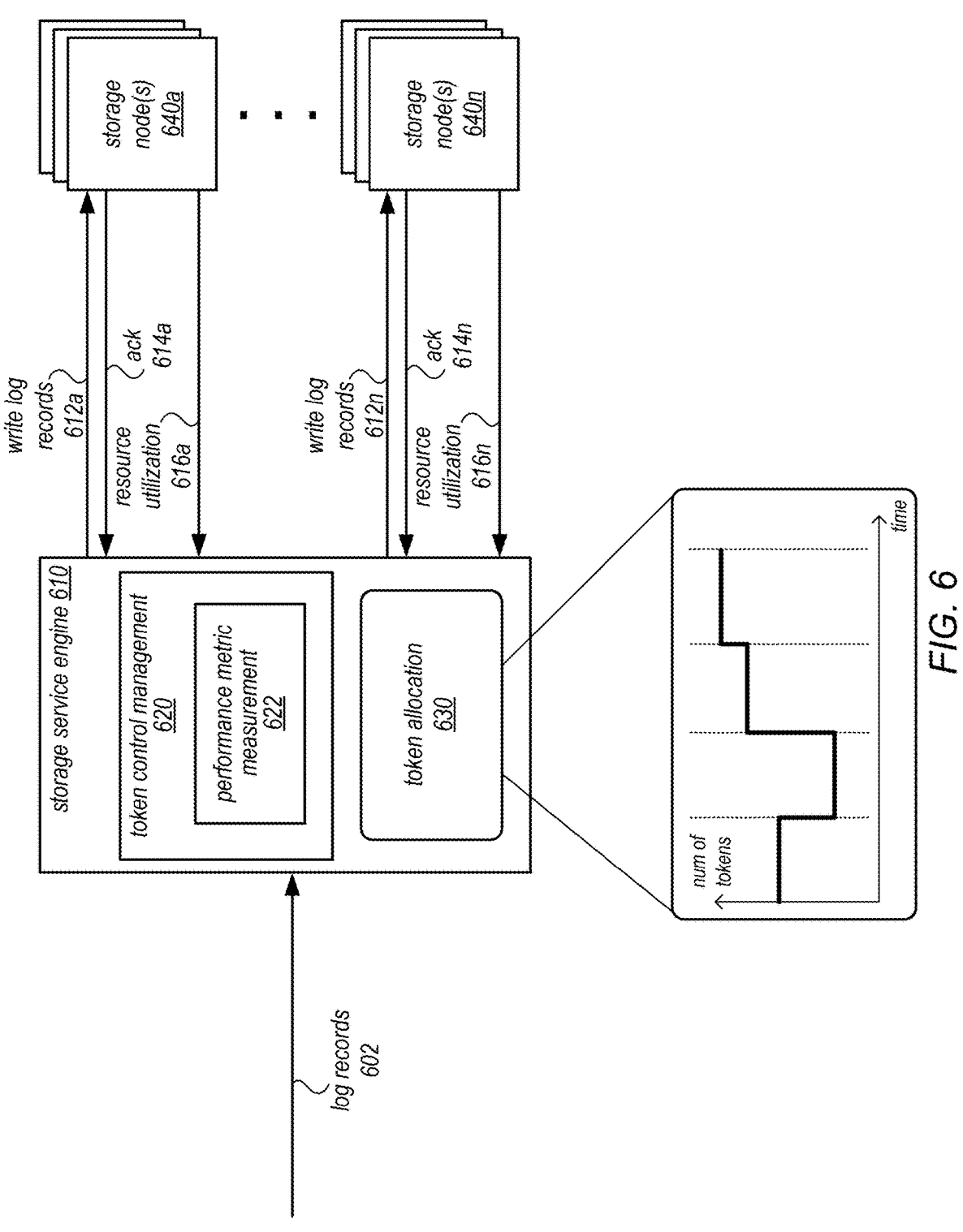
FIG. 6 is a block diagram illustrating interactions to implement dynamic token-based traffic control adjustment for a distributed data store at a storage service engine, according to some embodiments.

FIG. 6 is a block diagram illustrating interactions to implement dynamic token-based traffic control adjustment for a distributed data store at a storage service engine, according to some embodiments. Storage service engine 610 may implement token control management 620, which may implement the various techniques discussed below with regard to FIG. 10. Token control management 620 may manage a token allocation 630 used to perform requests to write log records to different storage nodes 640a and 640n (e.g., which may correspond to different protection groups of a database volume). Each write log record request 612a and 612n may use a token from token allocation, making that token unavailable for use until an acknowledgement 614a and 614n is received to return the token to being available. In at least some embodiments, a write quorum (e.g., 3 out of 4 writes successful) may have to be satisfied before a write can be considered completed. In at least some embodiment, a log record request may be sent as a batch of multiple log records (as discussed below with regard to FIG. 7). When no tokens are available, write requests are blocked.

Performance metric measurement 622 may track or determine performance measurements, including resource utilization 616a and 616n obtained from storage nodes and request performance, including throughput and latency determined at storage service engine 610. In at least one embodiment, resource utilization may be determined at storage service engine 610. Based on the performance information, a performance score may be determined (e.g., a score value being determined according to a combination, weighted or unweighted, of various performance metrics for a given time period). Then, the performance score may be compared with a performance score for a prior time period. If lower, then the token allocation may be increased by a number of tokens. If higher, then the token allocation may be lowered by a number of tokens. In some scenarios, the number of tokens may remain unchanged. In at least one embodiment, a random modification technique may be performed in order to select random number of tokens to allocate in order to avoid optimizing the token allocation to a local performance maxima instead of a global one. As indicated in the graph illustration in FIG. 6, the number of tokens may change over different periods of time according token allocation adjustments. Although not illustrated, in some embodiments, an unchanged performance score (or unchanged within a margin or threshold amount of change) may result in keeping token allocation 630 the same.

The following example embodiment, describes one possible embodiment of the more generally discussed techniques above. Other embodiments may also be envisioned with different metrics (or combinations with different metrics) or different ways of scoring. In the example embodiment:

N: Default token allocation of N tokens (e.g., defined by a storage engine thread count)

D: Incremental (when positive) or decremental (when negative) step apply to n in each iteration.

P: A performance score calculated based on different performance metrics.

Step 1: Starts with token allocation N and changing step D.

Step 2: Records storage engine performance as P

Step 3: Set inflight limit N=N+D

Step 4: Sleep for 10 sec

Step 5: Records storage engine performance P'.

Step 6: Compare performance scores P' and P. If P'<P (worse performance then previous iteration), set D=−D.

Step 7: Go to Step 3

CPU, TPS, Latency are performance indices (metrics), higher indices meaning better performance. For each index, multiply by a weight before adding them together. All weights may be configured base on instance types and can be changed dynamically. Total score ranges between 0 to 100, higher score means better performance.

$$\text{PerformanceScore}=\text{CpuPerformanceIndex}*\text{cpuPerformanceIndexWeight}+\text{ThroughputPerformanceIndex}*\text{throughputPerformanceIndexWeight}+\text{LatencyPerformanceIndex}*\text{latencyPerformanceIndexWeight}$$

CPU Performance Index: storage engine's CPU usage, higher usage gives lower score $$\text{Formula: CpuIndex}=(1-\text{storageEngineCpuUtiliztion})*10$$

Range: 0 to 10

Throughput Performance Index: storage engine's log write throughput, higher throughput dives higher score $$\text{Formula: ThroughputIndex}=5+((\text{CurrentLogrecordPerSec}/\text{PreviouslogrecordPerSec}-1)*10)$$

Range: Clamped between 0 and 10

Latency Performance Index:

$$\text{Formula: LatencyIndex}=10-\log 2(\text{BatchLatencyMs})$$

Range: Clamped between 0 and 10

As changes to database data are made using a log of changes, the point in the log which is made durable in the distributed data store may be tracked. This durability marker for the log, which may be referred to as a Volume Durable LSN (VDL) for a durability marker for a database volume, may be used to perform various operations or tasks. For example, if a database instance fails, the VDL may indicate what updates to a database have been consistently and durably made. Other uses for a durability marker for the database system (or other applications that use a log to track updates to a log in a distributed data store). As noted above, a storage service engine may batch requests obtained from a PG queue to send together to corresponding storage nodes in the protection group. Techniques that determine a durability marker for a log may take advantage of the batches of log records in order to reason what the durability marker for a volume is. FIG. 7 is a block diagram illustrating interactions for a storage service engine to implement advancing a durability marker for a log according to ordered log record batches, according to some embodiments.

Durability advancement management 720 may implement techniques discussed in detail below with regard to FIG. 11. For example, durability advancement management 720 may implement an ordered queue of log record batches 710 (which may be bound for different protection groups of storage nodes in some embodiments, as shown in FIG. 5 above). Each batch, 712a, 712b, 712c, and 712d may have tracked their respective minimum and maximum LSN values of log records in the batch. The ordering of batches in the queue may be according to minimum LSN values. The LSN values within a batch may not be contiguous (e.g., may be 1, 3, 6, 7) and in a next batch be 2, 4, 5, 8. In at least one embodiment, when batches are created, storage service engine may ensure that the records and thus LSN values are sent in LSN order so that a minimum LSN value is indicative that no LSN value lower than that LSN may be outstanding in the ordered queue of log record batches 710.

As discussed in the techniques below, as batches are initialized 702, sent 704, and acknowledgements received 706, durability advancement management 720 may advance the durability marker for the log based on the minimum LSN values of acknowledged batches (and/or maximum values in some scenarios). In at least some embodiments, a quorum requirement may be enforced with respect to acknowledgements form storage nodes. For example, if an acknowledgement for batch 712b is received, a durability marker may not be advanced according to the technique described in FIG. 11, as batch 712b is not the head or front of ordered queue of log record batches 710. Instead, the batch 712b may be recorded as persistent in tracking metadata for batches. When an acknowledgement of batch 712a is received, it may be recognized as the front of queue 710, and because batch 712b as the next batch is also persisted then the durability marker may be advanced to the minimum value of batch 712b-1 (because no LSN value earlier than the minimum LSN value of batch 712b can exist no batch that occurs later in ordered queue of log records would have an earlier LSN value because of the minimum value LSN ordering). If batch 712c were initialized, but not yet sent, then the highest max LSN value of the persisted LSN values may be set as the durability marker.

Various techniques described above with respect to a storage service engine may be enabled (or disabled) according to different performance characteristics or requirements of a client application that uses a database instance. In order to allow for these (and other features) to be changed, techniques to update storage engine configurations with restarting the storage engines may be implemented. FIG. 8 is a block diagram illustrating interactions with a volume manager and storage service engines to implement configuration hierarchy for updating storage engine configurations, according to some embodiments.

Volume manager 390 may implement storage engine configuration management 810, in at least one embodiment. Storage engine configuration management 810 may accept requests directly or indirectly from users via interfaces or other systems, such as a control plane, for specifying one or more features of one or more tiers of a hierarchy to enable or disable for a storage engine, in at least one embodiment. For example, in at least one embodiment, a hierarchy may be specified when a new database is created (or a new volume is created for an existing or new database). In at least one embodiment, a control plane or other system management component for a storage service (or individual storage nodes) may use requests 802 to specify particular changes to respond to larger problems (e.g., other service outages), to reduce workload or respond to other problems detected for a storage service 220 or database service 210. For example, if a new feature is enabled and an unintended consequence or problem occurs, a change to a hierarchy to add a feature override tier may be used to disable the feature until the problem can be resolved.

Hierarchies 812 may include multiple tiers including, but not limited to, a service-wide tier applicable to all storage service engines in a fleet of database instances, an account-specific tier, which may override portions of service-wide tier for a specific account of a database service, a volume-specific tier, which may override portions of other tiers, and feature override, which may be a specific override to disable certain features (e.g., which are causing service disruptions, security problems, or other issues which need to be resolved before enabling). Each tier may have access to the same features or parameters to enable, disable, or define (e.g., with values), in some embodiments. In other embodiments, some tiers may have access to different features or parameters to enable, disable, or define.

In at least one embodiment, when values for features or parameters conflict between different tiers, an order of precedence may be applied. For example, as illustrated in FIG. 8, in one embodiment, a feature override tier may take precedence over other tiers, while a volume specific tier may take precedence over account specific tier and service-wide tier, and account-specific tier may take precedence over service-wide tier. Please note that other orders of precedence or other types or numbers of tiers may be implemented in other embodiments. In at least some embodiments, features that may be enabled or disabled may include, but not be limited to shared memory communication of writes to a storage engine, discussed in FIGS. 1, 5, and 9, dynamic token-based traffic control adjustment for a distributed data store as discussed with regard to FIGS. 6, and 10, advancing a durability marker for a log according to ordered log record batches. Other features may include, but are not limited to thread management, auto-scaling, buffer sizes, memory pinning, or serverless management styles.

As indicated at 832, different storage service engines, 822*a*, 822*b*, 822*c*, and 822*d*, may request configurations from storage engine configuration management 810. These requests may be made periodically (e.g., at 5 minute intervals) or upon certain events. Storage engine configuration management 820, may identify a specific hierarchy 812 applicable to each storage service engine, and merge the various enabled features and disabled features according to order of precedence between tiers in order to generate a configuration which may be returned to a storage service engine 822. In at least one embodiment, the configurations may be specified in human readable format (e.g., JSON) or machine readable format (e.g., an executable format with instructions to perform or apply the configuration).

In at least one embodiment, different tiers may be stored in different locations (not illustrated), such as separate database tables, allowing different systems responsible for updating that tier access to the different tier for updates. For example, feature override table can be accessed and updated by a health or other monitoring system to update as part of a responsive action detected for an error or other problematic event. A volume or account specific table can be updated by a user facing interfaces (e.g., a control panel or other interface exposed to a user to support the enabling or disabling of various features, which may be translated into updates made to a respective tier in the hierarchy, even if those features are not presented as being implemented at a storage service engine but, for example, for a database instance as a whole. Likewise, service-wide features may be specified by a deployment system as part of rolling out new versions or features of storage service engine across a service.

Each storage service engine 822 may be able to update a runtime configuration or other file that can enable/disable features without restarting storage service engine 822. For example, a configuration may be applied by interpreting a JSON or other received configuration, parsing out the features to enable/disable or parameter values to set, and then updating the various files, settings, or other information used by storage service engines 822 to perform.

The database service and storage service discussed in FIGS. 2 through 8 provide examples of a database system that may implement various techniques described below, according to some embodiments. However, various other types of database systems and/or distributed storage systems may implement these techniques as well. FIG. 9 is a high-level flowchart illustrating various methods and techniques to implement shared memory communication of writes to a storage engine, according to some embodiments. Various different systems and devices may implement the various methods and techniques described below, either singly or working together. For example, a database service and storage service as discussed above may implement the various methods. Alternatively, a combination of different systems and devices may implement the various techniques. Therefore, the above examples and or any other systems or devices referenced as performing the illustrated method, are not intended to be limiting as to other different components, modules, systems, or configurations of systems and devices.

As indicated at 910, writes to a database from different clients may be received at a database management system, in at least one embodiment. In at least one embodiments, the writes may be directed to a same database (e.g., same set of tables, collection of documents, or other data set) but received from different clients using different connections (e.g., JDBC or ODBC) established between different client applications and a database system that includes the database management system (e.g., a database instance as discussed above). In at least one embodiment, the writes may be received via a connection-less protocol or technique, such as requests received via a REST style API, to put or update data. In at least one embodiment, one of the writes may be received as part of a transaction (e.g., that includes one or more other operations, including one or more reads, modifications, and/or other writes).

As indicated at 920, different request handling threads of the database management system may store respective records to perform the writes in streaming fashion to a back-end of a queue implemented as a circular buffer, the circular buffer being stored in shared memory accessible to a storage engine, in at least one embodiment. As discussed above with regard to FIGS. 1 and 5, a shared memory may provide access to multiple different programs or processes (which otherwise may not share access to other computing resources, operating in isolation from one another except through requests exchanged through interfaces or communication channels, such as shared memory). In at least one embodiment, different request handling threads may handle one (or multiple) writes, operating in parallel. In at least one embodiment, the respective records may log records or other copies of the action to perform (e.g., the write to perform) or the changed data itself. For example, the respective records may describe "current value+1" or "2" (where current value is "1"). In at least one embodiment, records may be log index records or other index records that point to larger information used to perform the write (e.g., to log storage blocks). In at least one embodiment, writes in streaming fashion may be performed by writing to the circular buffer as writes are received so that batching or other ordering/processing techniques that stop writes from being communicated to a storage engine are avoided.

As indicated at 930, the different respective request handling threads may update lock(s) to indicate to the storage engine that a portion of the circular buffer that includes the respective records can be read, in at least one embodiment. For example, in at least one embodiment a futex (e.g., a global futex for an entire buffer, or a specific futex for a portion of a buffer) may be updated (e.g., using a woke operation) in order to indicate that records can be read. In other embodiments, other synchronization objects (e.g., other types of locks, such as spinning locks or ticket locks)

can be used which can be accessible across program/process isolation boundaries, similar to shared memory.

As indicated at 940, responsive to detecting the updating of the one or more locks, read, the storage engine may read one or more of the respective records starting from a current front-end of the queue in the circular buffer to perform the writes to the database, in at least one embodiment. For example, in at least one embodiment, a call-back or other event may be triggered when a lock is updated. In another embodiment, a thread of a storage engine may periodically poll the lock(s) to detect that a portion of the circular buffer can be read. In at least one embodiment, a current-front end of the queue can be determined by an indicator in the lock(s) or may be determined by the storage engine which tracks last LSNs read by the storage engine to detect when an LSN is encountered in the queue in the circular buffer that has not been read.

Although discussed above in the context of a database system, distributed data stores may make use of traffic control techniques for many other applications (e.g., objects stores, key value stores, or other distributed data stores that are not database systems). Accordingly various client systems of a distributed data store may make use of the techniques described below that make dynamic adjustments to a token allocation. FIG. 10 is a high-level flowchart illustrating various methods and techniques to implement dynamic token-based traffic control adjustment for a distributed data store, according to some embodiments.

As indicated at 1010, performance metric(s) may be tracked for writes sent to a distributed data store during a period of time, in at least one embodiment. In at least one embodiment, performance metrics may include request performance metrics, which may include throughput (e.g., number of requests per time period), latency (e.g., amount of time to perform a request), request success rate, request failure rate, or other indicators of request performance. In at least one embodiment, a request may have to satisfy a quorum requirement (e.g., successful completion at a minimum number of locations in a distributed data store, such as 3 out of 5 locations). In at least one embodiment, performance metrics may include computing resource utilization, such as processor usage, memory usage, network usage, I/O usage, or other computing resource utilization. In some embodiments, performance information may be measured, captured, or otherwise tracked by a storage engine or other application that implements dynamic traffic management. In some embodiments, performance information may be collected from multiple different sources, such as from components of a distributed data store (e.g., storage nodes) or from monitoring or metering services a service, such as a database service implemented as part of a provider network.

As indicated at 1020, a performance score may be determined for a token allocation used to control writes to the distributed data store during the period of time, in at least one embodiment. Different combinations of performance metrics (or a single performance metric) may be used to generate a performance score. A performance score may correspond only to the period of time, or may be smoothed, weighted, or biased with respect to one or more past performance scores (e.g., to prevent large changes in performance scores causing large changes in token allocation). In at least one embodiment, weight values may be applied to performance metrics to determine a performance score, as shown in the example discussed above.

In at least some embodiment, an available token of the token allocation may be usable to send a pending write to the distributed data store. In at least one embodiment, a single token may be used for multiple write requests made to multiple locations in the distributed data store (e.g., in order to satisfy a quorum requirement). An unavailable token may be in-use (e.g., being used) for an in-flight write until the unavailable token is released upon completion or failure of the in-flight write. Pending writes may be blocked until there is at least one available token in the token allocation. Unlike token-based traffic management techniques that refill tokens after a period of time (e.g., according to a refill rate), tokens may only be released and made available when a write completes/fails. In this way, tokens may return the allocation according their the throughput of the corresponding writes.

As indicated at 1030, the performance score may be compared with a prior performance score determined for a prior period of time, in at least one embodiment. For example, the comparison may be made to determine a difference between performance scores. If the difference exceeds a difference threshold, an increase difference when the performance score is greater than the prior performance score, or a decrease difference when the performance score is lesser than the prior performance score, then a modification to the token allocation may be indicated. In at least one embodiment, more than one prior performance score may be considered as part of the comparison. In at least one embodiment, performance scores may be simply compared to determine whether the performance score is greater than, equal to, or lesser than the prior performance score.

As indicated at 1040, the token allocation used to control writes to the distributed data store may be modified for a subsequent period of time based, at least in part, on the comparison, in at least one embodiment. For example, if an increase in performance score indicates an improvement in performance, then an increase in the number of tokens in the token allocation may be made. In another example, if a decrease in performance score indicates a worsening in performance, then a decrease in the number of tokens may be made. In some scenarios, no token allocation modification may be made (e.g., if performance scores match or of the difference between performance scores does not exceed a threshold difference). Note, worse or better performance indicated by performance scores may be different according to whether a higher or lower score is better.

In at least one embodiment, modifications to a token allocation may be made according to a fixed amount (e.g., a fixed amount to increase or decrease the number of tokens according to a worse or better performance score for the time period). In at least one embodiment, modifications to a token allocation may correspond to (e.g., scale in accordance with) the difference in performance score, with an increasing number of tokens added or removed according to an increase in difference between performance scores. In at least one embodiment, a random number (e.g., positive or negative) may added to a scaled or fixed amount of change to a token allocation, or substituted entirely for the scaled or fixed amount of change. In this way, the random change may cause optimization that is provided automatically by modifying the token allocation according to performance score comparison to consider very different token allocations, avoiding being stuck in an amount of tokens that is a local maxima (e.g., an optimal value for a range of possible values but not the most optimal value across a larger (or the entire) range of number of tokens).

Durability markers for logs stored in a distributed data store may be used to perform various operations, including recovery and data compaction or reclamation. The faster a durability marker can accurately advance the less work that has to be done in the event that the durability marker is used to perform an operation (e.g., a higher durability marker reduces work to recover from a database system failure). Accordingly, techniques that increase the speed at which a durability marker can be determined, can improve the performance of operations that use the durability marker, or various other computer-related technologies that rely upon a log stored in a distributed data store. FIG. 11 is a high-level flowchart illustrating various methods and techniques to implement advancing a durability marker for a log according to ordered log record batches, according to some embodiments.

As indicated at 1110, different batches of log records may be sent to different locations of a distributed data store to update a log stored across the distributed data store, in at least one embodiment. For example, as discussed above with regard to FIG. 7, batches may correspond to different protection groups of storage nodes or other groups of locations within a distributed data store. In at least some embodiments, minimum and maximum LSN values for log records within each batch may be tracked. As indicated at 1120, the different batches may be ordered according to minimum Log Sequence Number (LSN) value within the different batches, in at least one embodiment.

As indicated at 1130, an acknowledgement may be received that one of the different batches is persisted at a location, in at least one embodiment. The acknowledgement may occur when a quorum requirement is satisfied in at least one embodiment (e.g., when a minimum number of acknowledgements has been received).

As indicated at 1140, a determination may be made as to whether the one received batch is first in the ordered batches (e.g., at the front of a queue), in at least one embodiment. If not, then as indicated at 1142, the one batch may be recorded as persisted, in at least one embodiment. For example, metadata tracking batch persistence may be updated.

If the received batch is first in the ordered batches, then as indicated at 1150, a determination may be made as to whether the next batch in the ordered batches is recorded as persisted, in at least one embodiment. For example, persistence or tracking metadata for batches may be accessed to determine the status of the next batch. If not persisted, then a determination may be made as to whether a next batch was not sent, as indicated at 1152. Similar to persistence metadata, tracking metadata for batches may indicate whether a batch has been initialized (e.g., prepared), but not yet sent, sent (e.g., in-flight), or persisted. For example, the next batch may have been initialized but not yet flushed to storage. If sent, then as indicated at 1142, record the one batch as persisted. If not, then as indicated at 1170, advance a durability marker for the log to a maximum LSN value across the persisted batches, in at least one embodiment. For example, if there are three persisted batches and the middle batch has a higher maximum LSN value than a later batch, then the higher maximum LSN may be the durability marker. In some embodiment, metadata may track the highest persisted LSN.

In at least one embodiment, if the next batch in the ordered batches is recorded as persistent, then as indicated at 1160, a durability marker may be advanced for the log based on a minimum LSN value of the next batch, in at least one embodiment. For example, it may be the minimum LSN value of the next batch minus 1 (e.g., min LSN value of next batch is "24", then durability marker may be advanced to "23").

FIG. 12 is a high-level flowchart illustrating various methods and techniques to implement configuration hierarchy for updating storage engine configurations, according to some embodiments. Different storage engine configurations can offer different performance characteristics for a database system that makes use of the storage engine to access database data. By implementing techniques to improve and customize the distribution of different configurations of a storage engine, the storage engine performance can be improved to satisfy different performance requirements, respond to performance problems, or otherwise implement new features with minimal to no down time. In this way, the performance of a storage engine (and database system) may be improved, as well as other computer-related technologies that rely upon database systems.

As indicated at 1210, a request may be sent for a storage engine configuration to storage engine configuration manager for a storage engine at a database instance hosted in a database service, the storage engine providing the database instance with access to database data stored in a separate storage service, in at least one embodiment. In at least one embodiment, the request may be sent by a storage engine. For example, a storage engine may periodically poll for updated storage configuration information. In at least one embodiment, the request may be sent by another system or component that manages storage engines. For example, a control plane of a database service may use a request to push out new configurations to one or more storage engines at database instances in the database service.

As indicated at 1220, the storage engine configuration manager may determine according to a hierarchy of storage configurations specified for the storage engine, the storage engine configuration including a composite of different features across different tiers in the hierarchy of storage configurations, in at least one embodiment. For example, each tier in the hierarchy may be separately maintained by different systems, services, or applications. Separate storage systems may be implemented to store the corresponding tier information for storage engines. In this way, each system, service, or application, can independently update information for a particular tier without interacting with other tiers (or their managing systems, services, or applications). In other embodiments, a central hierarchy repository may be maintained, accessible by different systems, services, or applications, or through a single coordinating system, service or application (e.g., via a volume manager of storage service 230).

In at least on embodiment, the tiers may be merged or combined by the storage engine configuration manager according to an order of precedence. One example of an order of precedence is discussed above with regard to FIG. 8. However, other examples and numbers of tiers may be implemented in other embodiments. In at least one embodiment, the merger of tiers may combine the information for a particular storage engine obtained from each tier, and the storage engine itself may apply the order of precedence when applying the configuration. As discussed above, the storage engine configuration may be human readable (e.g., JSON) or machine readable (e.g., an executable format with instructions to perform or apply the configuration).

As indicated at 1230, the storage engine configuration manager may send the storage engine configuration to the storage engine at the database instance, in at least one embodiment. As indicated at 1240, the storage engine configuration may be applied to update the storage engine to execute according to the storage engine configuration without restarting the storage engine at the database instance, in at least one embodiment. For example, various files, registries, or other settings may be changed without disrupting or restarting the storage engine. In at least one embodiment, the application may include interpreting or applying rules of precedence with respect to the content of the configuration. In at least one embodiment, applying the storage engine configuration may include executing a script or other instructions included in the storage engine configuration to update the storage engine.

The methods described herein may in various embodiments be implemented by any combination of hardware and software. For example, in one embodiment, the methods may be implemented by a computer system (e.g., a computer system as in FIG. 13) that includes one or more processors executing program instructions stored on a computer-readable storage medium coupled to the processors. The program instructions may implement the functionality described herein (e.g., the functionality of various servers and other components that implement the distributed systems described herein). The various methods as illustrated in the figures and described herein represent example embodiments of methods. The order of any method may be changed, and various elements may be added, reordered, combined, omitted, modified, etc.

Figure 13:
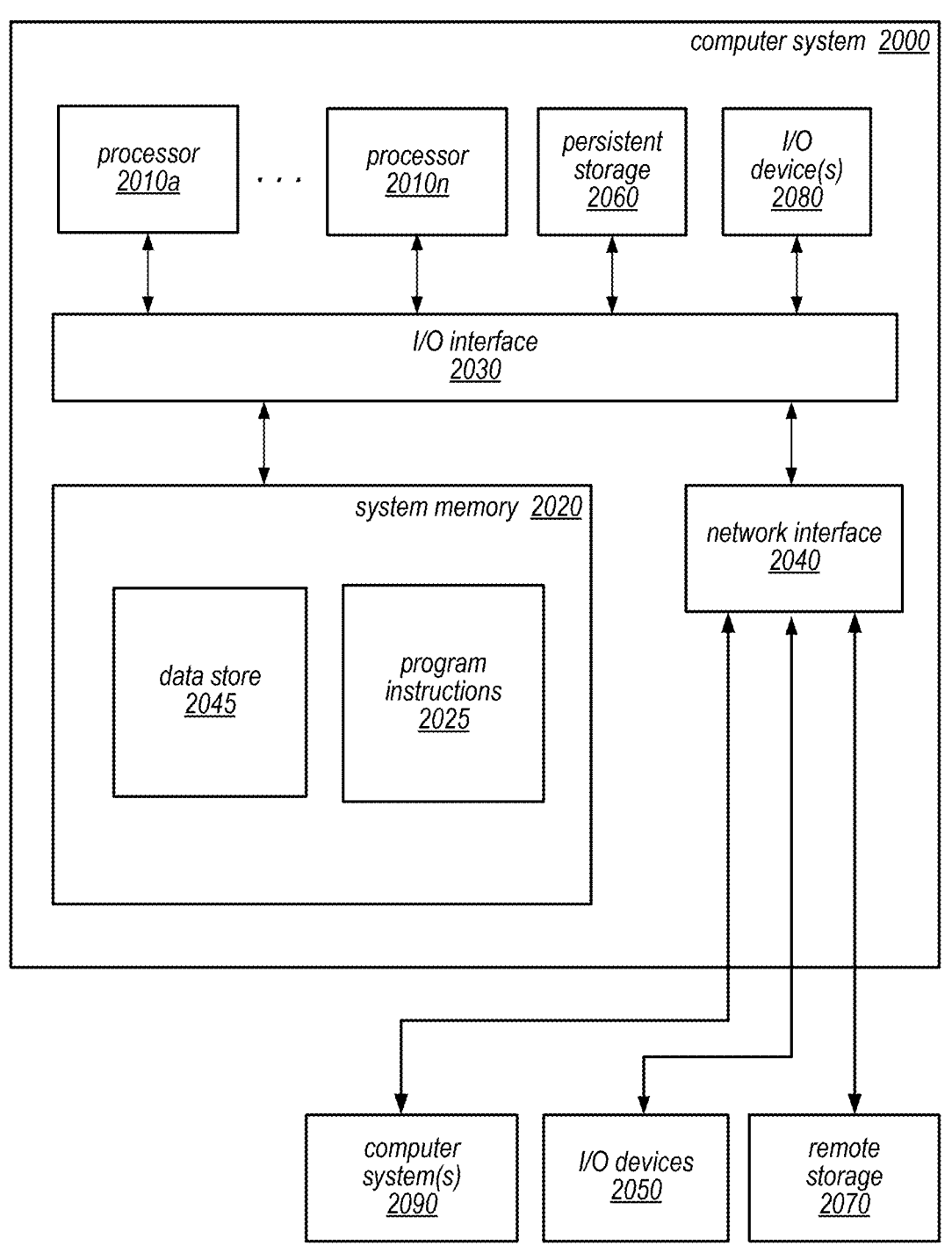
FIG. 13 is a block diagram illustrating an example computer system, according to various embodiments.

FIG. 13 is a block diagram illustrating an example computer system that may implement the techniques for working set ratio estimations of data items in a sliding time window for dynamically allocating computing resources for the data items, according to various embodiments described herein. For example, computer system 2000 may implement a database engine head node and/or one of a plurality of storage nodes of a separate storage system that stores database tables and associated metadata on behalf of clients of the database tier, in various embodiments. Computer system 2000 may be any of various types of devices, including, but not limited to, a personal computer system, desktop computer, laptop or notebook computer, mainframe computer system, handheld computer, workstation, network computer, a consumer device, application server, storage device, telephone, mobile telephone, or in general any type of computing device.

Computer system 2000 includes one or more processors 2010 (any of which may include multiple cores, which may be single or multi-threaded) coupled to a system memory 2020 via an input/output (I/O) interface 2030. Computer system 2000 further includes a network interface 2040 coupled to I/O interface 2030. In various embodiments, computer system 2000 may be a uniprocessor system including one processor 2010, or a multiprocessor system including several processors 2010 (e.g., two, four, eight, or another suitable number). Processors 2010 may be any suitable processors capable of executing instructions. For example, in various embodiments, processors 2010 may be general-purpose or embedded processors implementing any of a variety of instruction set architectures (ISAs), such as the x86, PowerPC, SPARC, or MIPS ISAs, or any other suitable ISA. In multiprocessor systems, each of processors 2010 may commonly, but not necessarily, implement the same ISA. The computer system 2000 also includes one or more network communication devices (e.g., network interface 2040) for communicating with other systems and/or components over a communications network (e.g. Internet, LAN, etc.). For example, a client application executing on system 2000 may use network interface 2040 to communicate with a server application executing on a single server or on a cluster of servers that implement one or more of the components of the database systems described herein. In another example, an instance of a server application executing on computer system 2000 may use network interface 2040 to communicate with other instances of the server application (or another server application) that may be implemented on other computer systems (e.g., computer systems 2090).

In the illustrated embodiment, computer system 2000 also includes one or more persistent storage devices 2060 and/or one or more I/O devices 2080. In various embodiments, persistent storage devices 2060 may correspond to disk drives, tape drives, solid state memory, other mass storage devices, or any other persistent storage device. Computer system 2000 (or a distributed application or operating system operating thereon) may store instructions and/or data in persistent storage devices 2060, as desired, and may retrieve the stored instruction and/or data as needed. For example, in some embodiments, computer system 2000 may host a storage system server node, and persistent storage 2060 may include the SSDs attached to that server node.

Computer system 2000 includes one or more system memories 2020 that may store instructions and data accessible by processor(s) 2010. In various embodiments, system memories 2020 may be implemented using any suitable memory technology, (e.g., one or more of cache, static random access memory (SRAM), DRAM, RDRAM, EDO RAM, DDR 20 RAM, synchronous dynamic RAM (SDRAM), Rambus RAM, EEPROM, non-volatile/Flash-type memory, or any other type of memory). System memory 2020 may contain program instructions 2025 that are executable by processor(s) 2010 to implement the methods and techniques described herein (e.g., various features of working set ratio estimations of data items in a sliding time window for dynamically allocating computing resources for the data items). In various embodiments, program instructions 2025 may be encoded in native binary, any interpreted language such as Java™ byte-code, or in any other language such as C/C++, Java™, etc., or in any combination thereof. In some embodiments, program instructions 2025 may implement multiple separate clients, server nodes, and/or other components.

In some embodiments, program instructions 2025 may include instructions executable to implement an operating system (not shown), which may be any of various operating systems, such as UNIX, LINUX, Solaris™, MacOS™, Windows™, etc. Any or all of program instructions 2025 may be provided as a computer program product, or software, that may include a non-transitory computer-readable storage medium having stored thereon instructions, which may be used to program a computer system (or other electronic devices) to perform a process according to various embodiments. A non-transitory computer-readable storage medium may include any mechanism for storing information in a form (e.g., software, processing application) readable by a machine (e.g., a computer). Generally speaking, a non-transitory computer-accessible medium may include computer-readable storage media or memory media such as magnetic or optical media, e.g., disk or DVD/CD-ROM coupled to computer system 2000 via I/O interface 2030. A non-transitory computer-readable storage medium may also include any volatile or non-volatile media such as RAM (e.g. SDRAM, DDR SDRAM, RDRAM, SRAM, etc.), ROM, etc., that may be included in some embodiments of computer system 2000 as system memory 2020 or another type of memory. In other embodiments, program instructions may be communicated using optical, acoustical or other form of propagated signal (e.g., carrier waves, infrared signals, digital signals, etc.) conveyed via a communication medium such as a network and/or a wireless link, such as may be implemented via network interface 2040.

In some embodiments, system memory 2020 may include data store 2045, which may be configured as described herein. For example, the information described herein as being stored by the database tier (e.g., on a primary node), such as a transaction log, an undo log, cached page data, or other information used in performing the functions of the database tiers described herein may be stored in data store 2045 or in another portion of system memory 2020 on one or more nodes, in persistent storage 2060, and/or on one or more remote storage devices 2070, at different times and in various embodiments. Along those lines, the information described herein as being stored by a read replica, such as various data records stored in a cache of the read replica, in-memory data structures, manifest data structures, and/or other information used in performing the functions of the read-only nodes described herein may be stored in data store 2045 or in another portion of system memory 2020 on one or more nodes, in persistent storage 2060, and/or on one or more remote storage devices 2070, at different times and in various embodiments. Similarly, the information described herein as being stored by the storage tier (e.g., redo log records, data pages, data records, and/or other information used in performing the functions of the distributed storage systems described herein) may be stored in data store 2045 or in another portion of system memory 2020 on one or more nodes, in persistent storage 2060, and/or on one or more remote storage devices 2070, at different times and in various embodiments. In general, system memory 2020 (e.g., data store 2045 within system memory 2020), persistent storage 2060, and/or remote storage 2070 may store data blocks, replicas of data blocks, metadata associated with data blocks and/or their state, database configuration information, and/or any other information usable in implementing the methods and techniques described herein.

In one embodiment, I/O interface 2030 may coordinate I/O traffic between processor 2010, system memory 2020 and any peripheral devices in the system, including through network interface 2040 or other peripheral interfaces. In some embodiments, I/O interface 2030 may perform any necessary protocol, timing or other data transformations to convert data signals from one component (e.g., system memory 2020) into a format suitable for use by another component (e.g., processor 2010). In some embodiments, I/O interface 2030 may include support for devices attached through various types of peripheral buses, such as a variant of the Peripheral Component Interconnect (PCI) bus standard or the Universal Serial Bus (USB) standard, for example. In some embodiments, the function of I/O interface 2030 may be split into two or more separate components, such as a north bridge and a south bridge, for example. Also, in some embodiments, some or all of the functionality of I/O interface 2030, such as an interface to system memory 2020, may be incorporated directly into processor 2010.

Network interface 2040 may allow data to be exchanged between computer system 2000 and other devices attached to a network, such as other computer systems 2090 (which may implement one or more storage system server nodes, primary nodes, read-only node nodes, and/or clients of the database systems described herein), for example. In addition, network interface 2040 may allow communication between computer system 2000 and various I/O devices 2050 and/or remote storage 2070. Input/output devices 2050 may, in some embodiments, include one or more display terminals, keyboards, keypads, touchpads, scanning devices, voice or optical recognition devices, or any other devices suitable for entering or retrieving data by one or more computer systems 2000. Multiple input/output devices 2050 may be present in computer system 2000 or may be distributed on various nodes of a distributed system that includes computer system 2000. In some embodiments, similar input/output devices may be separate from computer system 2000 and may interact with one or more nodes of a distributed system that includes computer system 2000 through a wired or wireless connection, such as over network interface 2040. Network interface 2040 may commonly support one or more wireless networking protocols (e.g., Wi-Fi/IEEE 802.11, or another wireless networking standard). However, in various embodiments, network interface 2040 may support communication via any suitable wired or wireless general data networks, such as other types of Ethernet networks, for example. Additionally, network interface 2040 may support communication via telecommunications/telephony networks such as analog voice networks or digital fiber communications networks, via storage area networks such as Fibre Channel SANs, or via any other suitable type of network and/or protocol. In various embodiments, computer system 2000 may include more, fewer, or different components than those illustrated in FIG. 13 (e.g., displays, video cards, audio cards, peripheral devices, other network interfaces such as an ATM interface, an Ethernet interface, a Frame Relay interface, etc.)

It is noted that any of the distributed system embodiments described herein, or any of their components, may be implemented as one or more network-based services. For example, a read-write node and/or read-only nodes within the database tier of a database system may present database services and/or other types of data storage services that employ the distributed storage systems described herein to clients as network-based services. In some embodiments, a network-based service may be implemented by a software and/or hardware system designed to support interoperable machine-to-machine interaction over a network. A web service may have an interface described in a machine-processable format, such as the Web Services Description Language (WSDL). Other systems may interact with the network-based service in a manner prescribed by the description of the network-based service's interface. For example, the network-based service may define various operations that other systems may invoke, and may define a particular application programming interface (API) to which other systems may be expected to conform when requesting the various operations.

In various embodiments, a network-based service may be requested or invoked through the use of a message that includes parameters and/or data associated with the network-based services request. Such a message may be formatted according to a particular markup language such as Extensible Markup Language (XML), and/or may be encapsulated using a protocol such as Simple Object Access Protocol (SOAP). To perform a network-based services request, a network-based services client may assemble a message including the request and convey the message to an addressable endpoint (e.g., a Uniform Resource Locator (URL)) corresponding to the web service, using an Internet-based application layer transfer protocol such as Hypertext Transfer Protocol (HTTP).

In some embodiments, network-based services may be implemented using Representational State Transfer ("RESTful") techniques rather than message-based techniques. For example, a network-based service implemented according to a RESTful technique may be invoked through parameters included within an HTTP method such as PUT, GET, or DELETE, rather than encapsulated within a SOAP message.

Although the embodiments above have been described in considerable detail, numerous variations and modifications may be made as would become apparent to those skilled in the art once the above disclosure is fully appreciated. It is intended that the following claims be interpreted to embrace all such modifications and changes and, accordingly, the above description to be regarded in an illustrative rather than a restrictive sense.

What is claimed is:

1. A system, comprising:

at least one processor; and a memory, storing program instructions that when executed by the at least one processor, cause the at least one processor to implement a storage engine for a database system that provides access to a distributed data store that stores a log recording updates to a database;

wherein the storage engine is configured to:

send different batches of log records to different locations of a distributed data store to update the log stored across the distributed data store;

order the different batches of log records according to a minimum Log Sequence Number (LSN) value within the different batches of log records;

receive an acknowledgement that one batch of the different batches of log records is persisted at one of the different locations;

determine that the one batch is a first batch in the ordered different batches;

determine that a next batch in the ordered different batches is acknowledged as persisted; and advance an LSN value of a durability marker for the log to at least the minimum LSN value of the next batch in the ordered different batches.

2. The system of claim 1, wherein the storage engine is further configured to:

receive an acknowledgement that a further batch of the different batches is persisted;

determine that the further batch of the different batches is a new first batch in the ordered different batches;

determine that a new next batch in the ordered different batches has not been sent; and advance the LSN value of the durability marker to at least match a maximum LSN value out of one or more persisted ones of the different batches.

3. The system of claim 1, wherein the storage engine is further configured to:

receive an acknowledgement that a further batch of the different batches is persisted;

determine that the further batch of the different batches is not the first batch in the ordered different batches; and record the further batch of the different batches as persisted.

4. The system of claim 1, wherein the different batches are sent to different groups of storage nodes that act as a protection group for a portion of the log in the distributed data store.

5. A method, comprising:

sending, by one or more processors implementing a storage client, different batches of log records to different locations of a distributed data store to update a log stored across the distributed data store;

ordering, by the storage client, the different batches of log records according to a minimum Log Sequence Number (LSN) value within the different batches of log records;

receiving, by the storage client, an acknowledgement that one batch of the different batches of log records is persisted at one of the different locations;

determining, by the storage client, that the one batch is a first batch in the ordered different batches;

determining, by the storage client, that a next batch in the ordered different batches is acknowledged as persisted; and advancing, by the storage client, an LSN value of a durability marker for the log to at least the minimum LSN value of the next batch in the ordered different batches.

6. The method of claim 5, further comprising:

receiving, by the storage client, an acknowledgement that a further batch of the different batches is persisted;

determining, by the storage client, that the further batch of the different batches is a new first batch in the ordered different batches;

determining, by the storage client, that a new next batch in the ordered different batches has not been sent; and advancing, by the storage client, the LSN value of the durability marker to at least a maximum LSN value out of one or more persisted ones of the different batches.

7. The method of claim 5, further comprising:

receiving, by the storage client, an acknowledgement that a further batch of the different batches is persisted;

determining, by the storage client, that the further batch of the different batches is not the first batch in the ordered different batches; and recording, by the storage client, the further batch of the different batches as persisted.

8. The method of claim 5, wherein the ordered different batches are stored in a queue implemented in a circular buffer.

9. The method of claim 5, further comprising:

receiving an acknowledgement that a further batch of the different batches is persisted;

determining that the further batch of the different batches is a new first batch in the ordered different batches;

determining that a new next batch in the ordered different batches is not recorded as persisted; and recording the further batch of the different batches as persisted.

10. The method of claim 5, wherein the different batches are sent to different groups of storage nodes that act as a protection group for a portion of the log in the distributed data store.

11. The method of claim 5, wherein LSN values in one or more of the different batches of log records are non-contiguous.

12. The method of claim 5, wherein the log describes respective updates to a database hosted by a database service implemented as part of a provider network.

13. One or more non-transitory, computer-readable storage media, storing program instructions that when executed on or across one or more computing devices cause the one or more computing devices to implement:

sending, by a storage client, different batches of log records to different locations of a distributed data store to update a log stored across the distributed data store;

ordering, by the storage client, the different batches of log records according to a minimum Log Sequence Number (LSN) value within the different batches of log records;

receiving, by the storage client, an acknowledgement that one batch of the different batches of log records is persisted at one of the different locations;

determining, by the storage client, that the one batch is a first batch in the ordered different batches;

determining, by the storage client, that a next batch in the ordered different batches is acknowledged as persisted; and advancing, by the storage client, an LSN value of a durability marker for the log to at least the minimum LSN value of the next batch in the ordered different batches.

14. The one or more non-transitory, computer-readable storage media of claim 13, storing further program instructions that when executed on or across the one or more computing devices cause the one or more computing devices to further implement:

receiving, by the storage client, an acknowledgement that a further batch of the different batches is persisted;

determining, by the storage client, that the further batch of the different batches is a new first batch in the ordered different batches;

determining, by the storage client, that a new next batch in the ordered different batches has not been sent; and advancing, by the storage client, the LSN value of the durability marker to at least a maximum LSN value out of one or more persisted ones of the different batches.

15. The one or more non-transitory, computer-readable storage media of claim 13, storing further program instructions that when executed on or across the one or more computing devices cause the one or more computing devices to further implement.

16. The one or more non-transitory, computer-readable storage media of claim 13, wherein the ordered different batches are stored in a queue implemented in a circular buffer.

17. The one or more non-transitory, computer-readable storage media of claim 13, storing further program instructions that when executed on or across the one or more computing devices cause the one or more computing devices to further implement:

receiving an acknowledgement that a further batch of the different batches is persisted;

determining that the further batch of the different batches is a new first batch in the ordered different batches;

determining that a new next batch in the ordered different batches is not recorded as persisted; and recording the further batch of the different batches as persisted.

18. The one or more non-transitory, computer-readable storage media of claim 13, wherein the different batches are sent to different groups of storage nodes that act as a protection group for a portion of the log in the distributed data store.

19. The one or more non-transitory, computer-readable storage media of claim 13, wherein LSN values in one or more of the different batches of log records are non-contiguous.

20. The one or more non-transitory, computer-readable storage media of claim 13, wherein the log describes respective updates to a database hosted by a database service implemented as part of a provider network.

\* \* \* \* \*